US011658598B2

(12) United States Patent
Kawakami et al.

(10) Patent No.: US 11,658,598 B2
(45) Date of Patent: May 23, 2023

(54) LINEAR MOTOR SYSTEM

(71) Applicant: Panasonic Intellectual Property Management Co., Ltd., Osaka (JP)

(72) Inventors: Renya Kawakami, Osaka (JP); Kenta Murakami, Osaka (JP); Toru Tazawa, Osaka (JP); Yusuke Nonogaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/782,923

(22) PCT Filed: Dec. 1, 2020

(86) PCT No.: PCT/JP2020/044738
§ 371 (c)(1),
(2) Date: Jun. 6, 2022

(87) PCT Pub. No.: WO2021/131542
PCT Pub. Date: Jul. 1, 2021

(65) Prior Publication Data
US 2023/0015803 A1    Jan. 19, 2023

(30) Foreign Application Priority Data
Dec. 27, 2019  (JP) .............................. JP2019-238380

(51) Int. Cl.
*H02P 25/064* (2016.01)
(52) U.S. Cl.
CPC .................................. *H02P 25/064* (2016.02)
(58) Field of Classification Search
CPC ..................................................... H02P 25/064
See application file for complete search history.

(56) References Cited

U.S. PATENT DOCUMENTS

2012/0187873 A1    7/2012 Nomura
2013/0229134 A1*   9/2013 Sato ...................... H02K 11/21
                                                           318/135
(Continued)

FOREIGN PATENT DOCUMENTS

JP         2831166 B2     2/1993
JP         5421709 B2     4/2011
(Continued)

OTHER PUBLICATIONS

International Search Report dated Mar. 2, 2021 in International Patent Application No. PCTJP2020/044738, with English translation.

*Primary Examiner* — Zoheb S Imtiaz
(74) *Attorney, Agent, or Firm* — McDermott Will & Emery LLP

(57)           ABSTRACT

A linear motor system includes: a stator including first to tenth coils; a mover including a permanent magnet; a switcher that switches one or more power supply target coils; and a control device that supplies power to the one or more power supply target coils by using a deviation integral value obtained by integrating a speed deviation that is a difference between an instructed speed of the mover and an actual speed of the mover. The control device includes: a compensator that calculates a post-division deviation integral value by dividing a post-summation deviation integral value, which is a value obtained by summing the deviation integral value used to supply power to each of the one or more power supply target coils immediately before the switching, by the total number of the one or more power supply target coils immediately after the switching; and a current control unit.

6 Claims, 14 Drawing Sheets

(56) References Cited

U.S. PATENT DOCUMENTS

2015/0035458 A1* 2/2015 Takase .................. H02P 25/06
                                                      318/135
2015/0303841 A1   10/2015 Suzuki et al.
2016/0226417 A1*  8/2016 Nomura ................ H02P 25/064

FOREIGN PATENT DOCUMENTS

JP        2015-033240 A    2/2015
JP           6313642 B2   11/2015

* cited by examiner

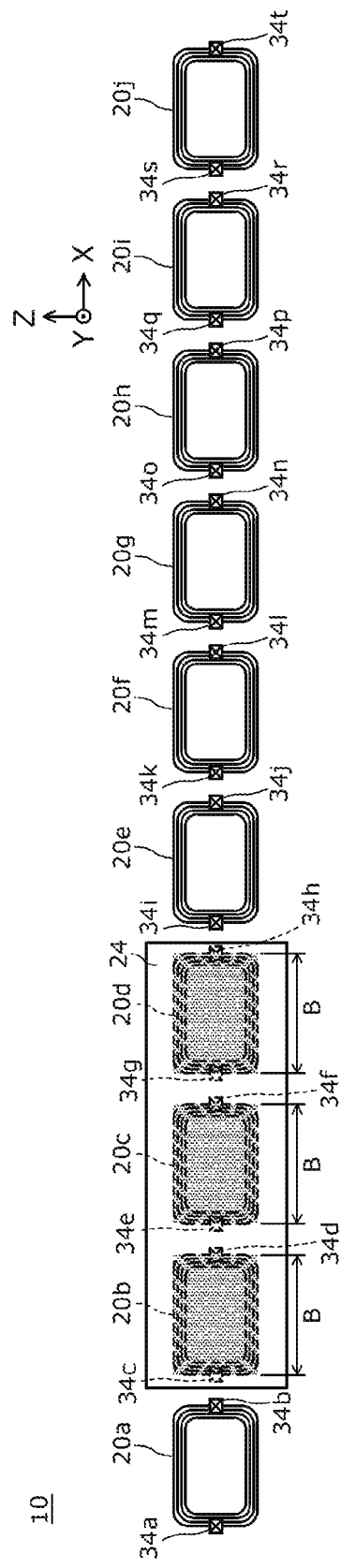

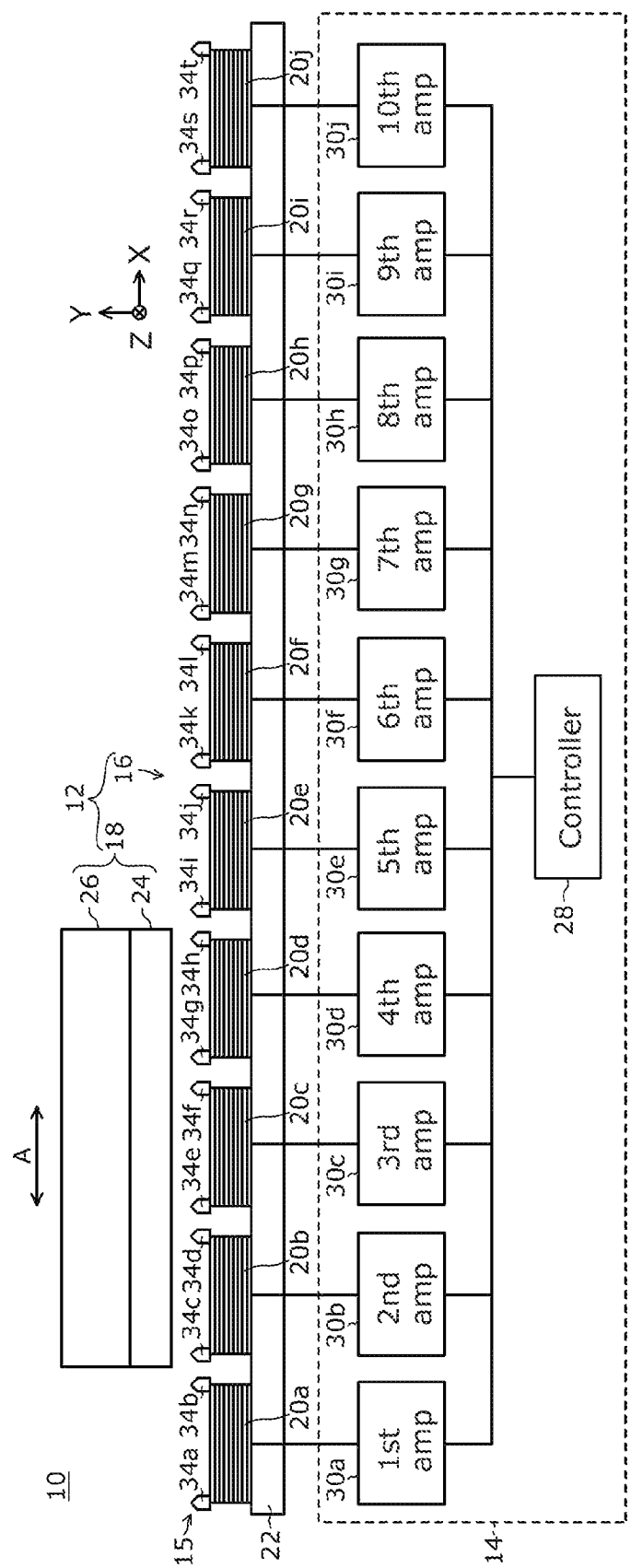

LINEAR MOTOR SYSTEM

CROSS-REFERENCE OF RELATED APPLICATIONS

This application is the U.S. National Phase under 35 U.S.C. § 371 of International Patent Application No. PCT/JP2020/044738, filed on Dec. 1, 2020, which in turn claims the benefit of Japanese Application No. 2019-238380, filed on Dec. 27, 2019, the entire disclosures of which Applications are incorporated by reference herein.

TECHNICAL FIELD

The present invention relates to a moving magnet type linear motor system.

BACKGROUND ART

A moving magnet type linear motor system in which a permanent magnet is moved relative to coils is conventionally known.

For example, Patent Literature (PTL) 1 discloses a linear motor system including: a stator in which a plurality of armature winding units are provided in a line; a mover that includes a permanent magnet and is provided opposite to the stator; and a control device that drives the mover by sequentially supplying power to armature winding units that face the mover out of the plurality of armature winding units, as power supply targets. The control device has a function of, when switching the armature winding units that serve as the power supply targets, performing power supply control switching compensation for armature winding units that serve as switch targets to which switching is performed. Specifically, the control device includes a plurality of second control devices that are connected to the plurality of armature winding units, and is configured to set speed integral values of the second control devices that correspond to the armature winding units selected as the power supply targets immediately before the switching, as the speed integral values of the second control devices of the switch targets.

CITATION LIST

Patent Literature

[PTL 1]
Japanese Unexamined Patent Application Publication No. 2015-33240

SUMMARY OF INVENTION

Technical Problem

However, in the linear motor system disclosed in PTL 1, when the total number of armature winding units that serve as power supply targets varies before and after switching, the speed integral values cannot be set appropriately. Accordingly, when the armature winding units that serve as the power supply targets are switched, a thrust applied to the mover sharply varies, and thus it is not possible to reduce the switching shock.

Accordingly, it is an object of the present invention to provide a linear motor system that can reduce the switching shock.

Solution to Problem

A linear motor system according to one aspect of the present disclosure includes: a stator including a plurality of coils that are arranged in a line; a mover including a permanent magnet disposed opposite to the plurality of coils; a switcher that selects, from among the plurality of coils, one or more coils each including a region extending across opposite ends in an arrangement direction that faces the permanent magnet as one or more power supply target coils that serve as power supply targets, and switches the one or more power supply target coils in response to a movement of the permanent magnet; and a control device that supplies power to the one or more power supply target coils by using a deviation integral value obtained by integrating a speed deviation that is a difference between an instructed speed of the mover and an actual speed of the mover, wherein the control device includes: a compensator that calculates a post-division deviation integral value by dividing a post-summation deviation integral value by a total number of the one or more power supply target coils immediately after the switching, the post-summation deviation integral value being a value obtained by summing the deviation integral value used to supply power to each of the one or more power supply target coils immediately before the switching; a speed control unit that generates a torque instruction by using the post-division deviation integral value calculated by the compensator; and a current control unit that supplies power to the one or more power supply target coils immediately after the switching, based on the torque instruction generated by the speed control unit.

Advantageous Effects of Invention

With the linear motor system according to the aspect of the present disclosure, it is possible to reduce switching shock.

BRIEF DESCRIPTION OF DRAWINGS

FIG. 1A is a diagram showing a configuration of a linear motor system according to Embodiment 1, as viewed from a transverse direction.

FIG. 1B is a diagram showing a configuration of the linear motor system shown in FIG. 1A, as viewed from a direction that is orthogonal to the transverse direction and is also orthogonal to an arrangement direction.

Figure 2:
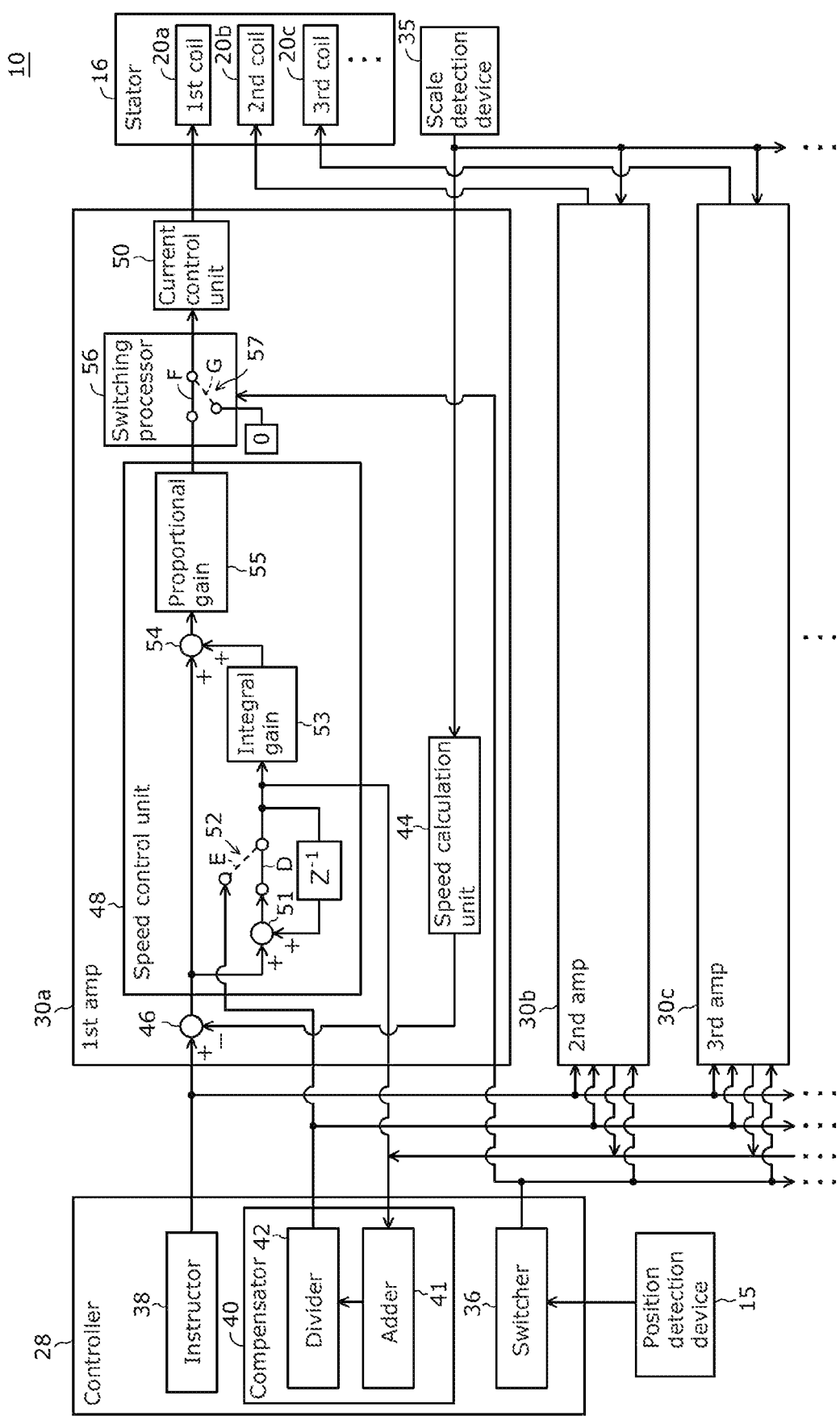
FIG. 2 is a block diagram showing a functional configuration of the linear motor system shown in FIG. 1A.

DESCRIPTION OF EMBODIMENTS (Background for Obtaining One Aspect of the Present Disclosure)

As described above, in the linear motor system disclosed in PTL 1, when the total number of armature winding units that serve as power supply targets varies before and after switching, it is not possible to reduce the switching shock.

For this reason, the inventors of the present application conducted in-depth studies and experiments for reducing the switching shock. As a result, the inventors found that it is possible to suppress sharp variation of thrust applied to the mover and reduce the switching shock by calculating a post-division deviation integral value, which is a value obtained by summing a deviation integral value used to supply power to each of one or more power supply target coils immediately before switching the one or more power supply target coils, by dividing a post-summation deviation integral value by the total number of one or more power supply target coils immediately after the switching, and supplying power to the one or more power supply target coils immediately after the switching by using the post-division deviation integral value.

The inventors further conducted in-depth studies and experiments based on the above findings, and arrived at a linear motor system according to one aspect of the present disclosure, which will be described below.

A linear motor system according to one aspect of the present disclosure includes: a stator including a plurality of coils that are arranged in a line; a mover including a permanent magnet disposed opposite to the plurality of coils; a switcher that selects, from among the plurality of coils, one or more coils each including a region extending across opposite ends in an arrangement direction that faces the permanent magnet as one or more power supply target coils that serve as power supply targets, and switches the one or more power supply target coils in response to a movement of the permanent magnet; and a control device that supplies power to the one or more power supply target coils by using a deviation integral value obtained by integrating a speed deviation that is a difference between an instructed speed of the mover and an actual speed of the mover, wherein the control device includes: a compensator that calculates a post-division deviation integral value by dividing a post-summation deviation integral value by a total number of the one or more power supply target coils immediately after the switching, the post-summation deviation integral value being a value obtained by summing the deviation integral value used to supply power to each of the one or more power supply target coils immediately before the switching; a speed control unit that generates a torque instruction by using the post-division deviation integral value calculated by the compensator; and a current control unit that supplies power to the one or more power supply target coils immediately after the switching, based on the torque instruction generated by the speed control unit.

According to the linear motor system configured as described above, the compensator calculates, when the one or more power supply target coils are switched, a post-division deviation integral value by dividing a post-summation deviation integral value by the total number of the one or more power supply target coils immediately after the switching, the post-summation deviation integral value being a value obtained by summing the deviation integral value used to supply power to each of the one or more power supply target coils immediately before the switching. Then, the speed control unit generates a torque instruction by using the calculated post-division deviation integral value, and the current control unit supplies power to the one or more power supply target coils immediately after the switching based on the generated torque instruction. Accordingly, even when the total number of one or more power supply target coils varies before and after the switching, it is possible to supply power to each of the one or more power supply target coils immediately after the switching by substantially equally dividing the sum of deviation integral values used immediately before the switching. As a result, it is possible to suppress sharp variation in thrust applied to the mover at the time of switching, and thus reduce the switching shock that occurs when the one or more power supply target coils are switched.

Also, the control device may include a plurality of control units provided in one-to-one correspondence with the plurality of coils. Each of the plurality of control units may include the speed control unit and the current control unit. The compensator may transmit, when the switching is performed, the post-division deviation integral value to one or more power supply target control units immediately after the switching, the one or more power supply target control units being one or more control units out of the plurality of control units that correspond to the one or more power supply target coils. The speed control unit included in each of the one or more power supply target control units immediately after the switching may generate the torque instruction by using the post-division deviation integral value. The current control unit included in each of the one or more power supply target control units immediately after the switching may supply power to the one or more power supply target coils immediately after the switching based on the torque instruction.

Also, each of the one or more power supply target control units immediately before the switching may calculate the deviation integral value by integrating the speed deviation to the post-division deviation integral value. The compensator may calculate the post-summation deviation integral value by summing the deviation integral value calculated by each of the one or more power supply target control units immediately before the switching.

Also, the control device may further include a superordinate control unit that is capable of communication with the plurality of control units, and the superordinate control unit may include the compensator.

Also, the plurality of control units may be capable of communication with each other. Each of the plurality of control units may include the compensator. The compensator included in each of the one or more power supply target control units immediately before the switching may calculate, when the switching is performed, the post-division deviation integral value by dividing the post-summation deviation integral value by the total number of the one or more power supply target coils immediately after the switching, and transmits the post-division deviation integral value to each of the one or more power supply target control units immediately after the switching.

Also, the linear motor system may further include a plurality of position detectors provided at opposite ends of each of the plurality of coils in the arrangement direction. In each of the plurality of coils, when one of the position detectors that is provided on a forward side in a moving direction of the permanent magnet in the arrangement direction detects a leading end of the permanent magnet, the switcher may select the coil on which the position detector is disposed as one of the one or more power supply target coils, and when another one of the position detectors that is provided on a rearward side in the moving direction of the permanent magnet in the arrangement direction detects a trailing end of the permanent magnet, the switcher may not select the coil on which the position detector is disposed as one of the one or more power supply target coils.

Hereinafter, a specific example of a linear motor system according to one aspect of the present disclosure will be described with reference to the drawings. The embodiments described below show generic or specific examples. The numerical values, shapes, materials, structural elements, the arrangement and connection of the structural elements, and the like shown in the following embodiments are merely examples, and therefore are not intended to limit the scope of the present disclosure.

In addition, the diagrams are schematic representations, and thus are not necessarily true to scale. Also, in the diagrams, structural elements that are substantially the same are given the same reference numerals, and a redundant description may be omitted or simplified.

Also, in the diagrams that are referred to in the description of the embodiments given below, a coordinate system may be shown. The X axis direction in the coordinate system is an arrangement direction in which a plurality of coils are arranged. The Y axis direction in the coordinate system is a direction that is orthogonal to the X axis direction, and is a transverse direction that is orthogonal to the arrangement direction. Also, the Z axis direction in the coordinate system is a direction that is orthogonal to the X axis direction, and is also orthogonal to the Y axis direction.

Embodiment 1

Hereinafter, linear motor system 10 according to Embodiment 1 will be described with reference to the drawings.

FIG. 1A is a diagram showing a configuration of linear motor system 10 according to Embodiment 1, as viewed from the transverse direction. FIG. 1B is a diagram showing a configuration of linear motor system 10 shown in FIG. 1A, as viewed from a direction that is orthogonal to the transverse direction and is also orthogonal to an arrangement direction. In FIG. 1A, in order to avoid complex drawings, base 22, carrier 26, and the like are not illustrated. The configuration of linear motor system 10 according to Embodiment 1 will be described with reference to FIGS. 1A and 1B.

As shown in FIGS. 1A and 1B, linear motor system 10 includes linear motor 12, control device 14, and position detection device 15.

Linear motor 12 includes stator 16 and mover 18 that is movable relative to stator 16. Linear motor 12 is a moving magnet type linear motor in which permanent magnet 24 (which will be described later) moves relative to first to tenth coils 20a to 20j (which will be described later).

Stator 16 includes first to tenth coils 20a to 20j and base 22 to which first that to tenth coils 20a to 20j are fixed. As described above, stator 16 includes a plurality of (ten in the present embodiment) coils. Stator 16 may include eleven or more coils, or nine or less coils.

First to tenth coils 20a to 20j are arranged in a line. First to tenth coils 20a to 20j are linearly arranged, but may be arranged in a curve. As shown in FIG. 1A, each of first to tenth coils 20a to 20j is wound in the transverse direction (Y axis direction) that is orthogonal to the arrangement direction (X axis direction) in which first to tenth coils 20a to 20j are arranged, and is disposed so as to be open in the transverse direction.

Mover 18 includes permanent magnet 24 and carrier 26 that is attached to permanent magnet 24.

Permanent magnet 24 is disposed opposite to first to tenth coils 20a to 20j in the transverse direction. Specifically, permanent magnet 24 is disposed opposite to a few of first to tenth coils 20a to 20j in the transverse direction. Permanent magnet 24 is movable along first to tenth coils 20a to 20j in the arrangement direction (see arrow A shown in FIG. 1B). Permanent magnet 24 has magnetic poles (not shown) aligned in the arrangement direction. For example, permanent magnet 24 has a plurality of N poles and a plurality of S poles, with the N poles and the S pole being alternately provided in the arrangement direction. Permanent magnet 24 is formed to have a size that entirely overlaps three adjacent coils out of first to tenth coils 20a to 20j when viewed from the transverse direction. In the state shown in FIGS. 1A and 1B, permanent magnet 24 is disposed to entirely overlap three adjacent coils, namely, second coil 20b, third coil 20c, and fourth coil 20d, out of first to tenth coils 20a to 20j when viewed from the transverse direction. In other words, in the state shown in FIGS. 1A and 1B, a region extending across opposite ends (see arrows B and dotted regions shown in FIG. 1A) of each of second coil 20b, third coil 20c, and fourth coil 20d in the arrangement direction when viewed from the transverse direction is disposed to face permanent magnet 24, and overlaps permanent magnet 24 when viewed from the transverse direction. The size of permanent magnet 24 is not limited thereto, and for example, permanent magnet 24 may be formed to have a size that entirely overlaps two adjacent coils out of first to tenth coils 20a to 20j when viewed from the transverse direction, or a size that entirely overlaps four or more adjacent coils out of first to tenth coils 20a to 20j when viewed from the transverse direction. Also, permanent magnet 24 may be formed in a substantially U shape that clamps first to tenth coils 20a to 20j in the transverse direction. Alternatively, permanent magnet 24 may be formed in a substantially U shape that clamps first to tenth coils 20a to 20j in a direction (Z axis direction) that is orthogonal to the arrangement direction and is also orthogonal to the transverse direction.

Control device 14 is a device that controls linear motor 12. Control device 14 causes mover 18 to move to a desired position relative to stator 16 by supplying power to one or more power supply target coils that serve as power supply targets out of first to tenth coils 20a to 20j. Control device 14 includes controller 28 and first to tenth amplifiers 30a to 30j that are connected to controller 28 and first to tenth coils 20a to 20j. As described above, control device 14 includes a plurality of (ten in the present embodiment) amplifiers. In the present embodiment, controller 28 corresponds to the superordinate control unit, and first to tenth amplifiers 30a to 30j correspond to the plurality of control units.

Controller 28 recognizes the position of permanent magnet 24 based on information from position detection device 15, and selects one or more power supply target coils according to the position of permanent magnet 24. Controller 28 is capable of communication with first to tenth amplifiers 30a to 30j, and transmits an instruction such as a speed instruction or a position instruction to one or more power supply target amplifiers that are amplifiers out of first to tenth amplifiers 30a to 30j that correspond the selected one or more power supply target coils. In the state shown in FIGS. 1A and 1B, second coil 20b, third coil 20c, and fourth coil 20d serve as the power supply target coils, and second amplifier 30b, third amplifier 30c, and fourth amplifier 30d serve as the power supply target amplifiers. In the present embodiment, the power supply target amplifiers correspond to the power supply target control units.

First to tenth amplifiers 30a to 30j are provided in one-to-one correspondence with first to tenth coils 20a to 20j. Specifically, first amplifier 30a is provided in correspondence with first coil 20a, and second amplifier 30b is provided in correspondence with second coil 20b. The same applies to third to tenth amplifiers 30c to 30j. Each of the one or more power supply target amplifiers that are amplifiers out of first to tenth amplifiers 30a to 30j that correspond the selected one or more power supply target coils supplies power to the corresponding power supply target coil by using a deviation integral value obtained by integrating a speed deviation that is a difference between an instructed speed of mover 18 and an actual speed of mover 18. In the state shown in FIGS. 1A and 1B, second amplifier 30b supplies power to second coil 20b by using the deviation integral value, and third amplifier 30c supplies power to third coil 20c by using the deviation integral value, and fourth amplifier 30d supplies power to fourth coil 20d by using the deviation integral value.

When power is supplied to each power supply target coil, the power supply target coil is magnetized, and permanent magnet 24 is pulled or pushed by the power supply target coil, which causes mover 18 to move. The magnetic poles of each power supply target coil can be changed by changing the flow direction of electric current supplied to the power supply target coil. For example, if electric current flows clockwise when viewed from mover 18 side in the transverse direction, mover 18 side of the power supply target coil in the transverse direction serves as the S pole, and the side of the power supply target coil opposite to mover 18 side serves as the N pole. Conversely, if electric current flows counterclockwise when viewed from mover 18 side in the transverse direction, mover 18 side of the power supply target coil serves as the N pole, and the side of the power supply target coil opposite to mover 18 side serves as the S pole. Each power supply target amplifier determines the flow direction of electric current supplied to the power supply target coil according to the positions of the magnetic poles (the N pole and the S pole) of permanent magnet 24.

Controller 28 sequentially switches each power supply target coil and supplies power to the power supply target coil in response to a movement of permanent magnet 24, and causes mover 18 to move to a desired position.

Position detection device 15 is a device that detects the position of permanent magnet 24. Position detection device 15 includes first to twentieth position sensors 34a to 34t that are disposed at opposite ends of each of first to tenth coils 20a to 20j in the arrangement direction. As described above, position detection device 15 includes a plurality of (twenty in the present embodiment) position sensors. First position sensor 34a and second position sensor 34b are disposed at opposite ends of first coil 20a in the arrangement direction, third position sensor 34c and fourth position sensor 34d are disposed at opposite ends of second coil 20b in the arrangement direction, fifth position sensor 34e and sixth position sensor 34f are disposed at opposite ends of third coil 20c in the arrangement direction, seventh position sensor 34g and eighth position sensor 34h are disposed at opposite ends of fourth coil 20d in the arrangement direction, and ninth position sensor 34i and tenth position sensor 34j are disposed at opposite ends of fifth coil 20e in the arrangement direction. Eleventh position sensor 34k and twelfth position sensor 34l are disposed at opposite ends of sixth coil 20f in the arrangement direction, thirteenth position sensor 34m and fourteenth position sensor 34n are disposed at opposite ends of seventh coil 20g in the arrangement direction, fifteenth position sensor 34o and sixteenth position sensor 34p are disposed at opposite ends of eighth coil 20h in the arrangement direction, seventeenth position sensor 34q and eighteenth position sensor 34r are disposed at opposite ends of ninth coil 20i in the arrangement direction, and nineteenth position sensor 34s and twentieth position sensor 34t are disposed at opposite ends of tenth coil 20j in the arrangement direction. In the present embodiment, first to twentieth position sensors 34a to 34t correspond to the plurality of position detectors.

Each of first to twentieth position sensors 34a to 34t detects permanent magnet 24 that faces the position sensor in the transverse direction. In the state shown in FIGS. 1A and 1B, first position sensor 34a and second position sensor 34b do not face permanent magnet 24 in the transverse direction, and thus transmit a signal indicating that they have not detected permanent magnet 24 to controller 28 and first to tenth amplifiers 30a to 30j. As a result, controller 28 and first to tenth amplifiers 30a to 30j recognize that the region extending across opposite ends of first coil 20a in the arrangement direction when viewed from the transverse direction does not face permanent magnet 24 in the transverse direction. In other words, as a result, controller 28 and first to tenth amplifiers 30a to 30j recognize that the entirety of first coil 20a does not overlap permanent magnet 24 when viewed from the transverse direction. The same applies to ninth to twentieth position sensors 34i to 34t. In contrast, third position sensor 34c and fourth position sensor 34d face permanent magnet 24 in the transverse direction, and thus transmit a signal indicating that they have detected permanent magnet 24 to controller 28 and first to tenth amplifiers 30a to 30j. As a result, controller 28 and first to tenth amplifiers 30a to 30j recognize that the region extending across opposite ends of second coil 20b in the arrangement direction when viewed from the transverse direction faces permanent magnet 24, and overlaps permanent magnet 24 in the transverse direction. In other words, as a result, controller 28 and first to tenth amplifiers 30a to 30j recognize that the entirety of second coil 20b overlaps permanent magnet 24 when viewed from the transverse direction. The same applies to fifth to eighth position sensors 34e to 34h.

Also, each of first to twentieth position sensors 34a to 34t detects a leading end and a trailing end of permanent magnet 24 in a movement direction in which permanent magnet 24 moves. For example, when first position sensor 34a faces the leading end of permanent magnet 24 in the movement direction in the transverse direction, first position sensor 34a transmits a signal indicating that the leading end of permanent magnet 24 has been detected to controller 28 and first to tenth amplifiers 30a to 30j. For example, first position sensor 34a detects the leading end of permanent magnet 24 by detecting a mark or the like that is attached to the leading end of permanent magnet 24. Likewise, when first position sensor 34a faces the trailing end of permanent magnet 24 in the movement direction in the transverse direction, first position sensor 34a transmits a signal indicating that the trailing end of permanent magnet 24 has been detected to controller 28 and first to tenth amplifiers 30a to 30j. For example, first position sensor 34a detects the trailing end of permanent magnet 24 by detecting a mark or the like that is attached to the trailing end of permanent magnet 24. The same applies to fifth to second to twentieth position sensors 34b to 34t.

FIG. 2 is a block diagram showing a functional configuration of linear motor system 10 shown in FIG. 1A. The functional configuration of linear motor system 10 shown in FIG. 1A will be described with reference to FIG. 2.

As shown in FIG. 2, linear motor system 10 further includes scale detection device 35. Scale detection device 35 is a device that detects a scale (not shown) provided in mover 18. Scale detection device 35 is implemented by, for example, an encoder or the like.

Controller 28 includes switcher 36, instructor 38, and compensator 40.

Switcher 36 is connected to position detection device 15, and selects one or more power supply target coils based on information from position detection device 15, and transmits, to switching processors 56 (which will be described later) that are included in first to tenth amplifiers 30a to 30j, a switching signal for determining whether the one or more power supply target coils are power supply targets. Specifically, switcher 36 selects, as one or more power supply target coils, one or more coils from among first to tenth coils 20a to 20j, each of the one or more coils including a region extending across opposite ends in the arrangement direction when viewed from the transverse direction that faces permanent magnet 24 in the transverse direction. In other words, switcher 36 selects, as one or more power supply target coils, one or more coils from among first to tenth coils 20a to 20j, the one or more coils entirely overlapping permanent magnet 24 when viewed from the transverse direction. Furthermore, switcher 36 transmits, to switching processors 56 of one or more power supply target amplifiers, a switching signal that determines that the selected one or more coils are power supply targets.

For example, when the position sensor on the forward side in the moving direction of permanent magnet 24 in the arrangement direction in each of first to tenth coils 20a to 20j detects the leading end of permanent magnet 24, switcher 36 selects a coil on which the position sensor is disposed as a power supply target coil. Furthermore, switcher 36 transmits a switching signal that determines that the selected coil is a power supply target to switching processor 56 of the power supply target amplifier. For example, as shown in FIGS. 1A and 1B, in the case where the moving direction of permanent magnet 24 extends from first coil 20a side toward tenth coil 20j side (plus X axis direction), when eighth position sensor 34h on the forward side in the moving direction of permanent magnet 24 detects the leading end of permanent magnet 24, switcher 36 selects fourth coil 20d on which eighth position sensor 34h is disposed as a power supply target coil. Furthermore, switcher 36 transmits a switching signal that determines that the selected coil is a power supply target to switching processor 56 of fourth amplifier 30d. The same applies to first to third coils 20a to 20c and fifth to tenth coils 20e to 20j.

Also, for example, when the position sensor on the rearward side in the moving direction of permanent magnet 24 in the arrangement direction in each of first to tenth coils 20a to 20j detects the trailing end of permanent magnet 24, switcher 36 does not select a coil on which the position sensor is disposed as a power supply target coil. Furthermore, switcher 36 transmits a switching signal that determines that the selected coil is not a power supply target to switching processor 56 of an amplifier that corresponds to the selected coil.

For example, as shown in FIGS. 1A and 1B, in the case where the moving direction of permanent magnet 24 extends from first coil 20a side toward tenth coil 20j side (plus X axis direction), when third position sensor 34c on the rearward side in the moving direction of permanent magnet 24 detects the trailing end of permanent magnet 24, switcher 36 does not select second coil 20b on which third position sensor 34c is disposed as a power supply target coil. Furthermore, switcher 36 transmits a switching signal that determines that the selected coil is not a power supply target to switching processor 56 of second amplifier 30b. The same applies to first coil 20a and third to tenth coils 20c to 20j.

In the state shown in FIGS. 1A and 1B, switcher 36 selects second coil 20b, third coil 20c, and fourth coil 20d as power supply target coils. Furthermore, switcher 36 transmits a switching signal that determines that the selected coils are power supply targets to switching processors 56 of second amplifier 30b, third amplifier 30c, and fourth amplifier 30d. Also, when permanent magnet 24 moves as a result of power being supply to the one or more power supply target coils, switcher 36 switches the one or more power supply target coils according to the position of permanent magnet 24.

Instructor 38 is connected to first to tenth amplifiers 30a to 30j, and transmits an instruction such as a speed instruction or a position instruction to one or more power supply target amplifiers that correspond to the one or more power supply target coils selected by switcher 36 from among first to tenth amplifiers 30a to 30j. For example, in the case where first coil 20a is selected as a power supply target coil, an amplifier that corresponds to the power supply target coil is first amplifier 30a, and thus instructor 38 transmits an instruction to first amplifier 30a. Also, in the case where second coil 20b is selected as a power supply target coil, an amplifier that corresponds to the power supply target coil is second amplifier 30b, and thus instructor 38 transmits an instruction to second amplifier 30b. The same applies to third to tenth amplifiers 30c to 30j. In the state shown in FIGS. 1A and 1B, second to fourth amplifiers 30b to 30d are selected as power supply target amplifiers, and thus instructor 38 transmits an instruction to second to fourth amplifiers 30b to 30d.

When switcher 36 switches the one or more power supply target coils, compensator 40 performs compensation for the one or more power supply target amplifiers immediately after switching. Specifically, when switcher 36 switches the one or more power supply target coils, compensator 40 calculates a post-division deviation integral value by dividing a post-summation deviation integral value, which is a value obtained by dividing a post-summation deviation integral value, which is a value obtained by summing the deviation integral values used to supply power to the one or more power supply target coils immediately before switching, by the total number of one or more power supply target coils immediately after switching, and performs compensation by transmitting the calculated post-division deviation integral value to each of the one or more power supply target amplifiers immediately after switching. Compensator 40 includes adder 41 and divider 42.

Adder 41 is connected to first to tenth amplifiers 30a to 30j. When switcher 36 switches the one or more power supply target coils, adder 41 acquires the calculated deviation integral values calculated by the one or more power supply target amplifiers immediately before switching, and calculates a post-summation deviation integral value by summing the acquired deviation integral values, the post-summation deviation integral value being the sum of deviation integral values used to supply power to the one or more power supply target coils immediately before switching.

Divider 42 calculates a post-division deviation integral value by dividing the post-summation deviation integral value calculated by adder 41 by the total number of one or more power supply target coils immediately after the one or more power supply target coils are switched by switcher 36. Divider 42 transmits the calculated post-division deviation integral value to each of the one or more power supply target amplifiers immediately after switching.

First amplifier 30a includes speed calculation unit 44, deviation calculation unit 46, speed control unit 48, current control unit 50, and switching processor 56.

Speed calculation unit 44 is connected to scale detection device 35, and calculates an actual speed of permanent magnet 24 based on information and the like from scale detection device 35. For example, speed calculation unit 44 calculates a movement distance of mover 18 from a value read by scale detection device 35 from the scale (not shown) provided in mover 18. Also, speed calculation unit 44 acquires, from a timer (not shown) or the like, movement time required for mover 18 to move the movement distance. Then, speed calculation unit 44 calculates an actual speed of permanent magnet 24 from the movement distance and the movement time.

Deviation calculation unit 46 is connected to instructor 38, and receives an instruction such as a speed instruction or a position instruction transmitted from instructor 38. Also, deviation calculation unit 46 is connected to speed calculation unit 44, and acquires the actual speed of permanent magnet 24 calculated by speed calculation unit 44. For example, in the case where deviation calculation unit 46 receives a speed instruction, deviation calculation unit 46 calculates a speed deviation that is a difference between an instructed speed of permanent magnet 24 indicated by the speed instruction and the actual speed of permanent magnet 24. Also, in the case where deviation calculation unit 46 receives a position instruction, deviation calculation unit 46 calculates a speed deviation that is a difference between an instructed speed calculated based on the position instruction and the actual speed of permanent magnet 24. The position instruction is, for example, an instruction for causing mover 18 to move to a predetermined position in a predetermined time, and the instructed speed can be calculated based on the predetermined time and the distance to the predetermined position.

Speed control unit 48 includes adder 51, switch 52, and adder 54.

Adder 51 calculates a deviation integral value by integrating the speed deviation calculated by deviation calculation unit 46. Adder 51 calculates a new deviation integral value by adding the speed deviation to the deviation integral value calculated immediately beforehand. The calculated deviation integral value is multiplied by integral gain 53, and input to adder 54, also transmitted to adder 41 of controller 28, and input to adder 51. After that, each time a new speed deviation is calculated, adder 51 calculates a new deviation integral value by adding the calculated new speed deviation to the deviation integral value calculated immediately beforehand. In this way, adder 51 calculates the deviation integral value by integrating the speed deviation.

Switch 52 is configured to be switchable between a state in which adder 51 and adder 54 are connected (see D shown in FIG. 2) and a state in which compensator 40 and adder 54 are connected (see E shown in FIG. 2). Switch 52 is normally in the state in which adder 51 and adder 54 are connected. When switcher 36 switches the one or more power supply target coils, switch 52 is instantaneously switched from the state in which adder 51 and adder 54 are connected to the state in which compensator 40 and adder 54 are connected. For example, when the power supply target amplifiers immediately after switching receives an instruction from instructor 38, switches 52 of the power supply target amplifiers immediately after switching are instantaneously switched from the state in which adder 51 and adder 54 are connected to the state in which compensator 40 and adder 54 are connected.

When switch 52 is in the state in which adder 51 and adder 54 are connected (see D shown in FIG. 2), the deviation integral value calculated by adder 51 is multiplied by integral gain 53, and input to adder 54. Also, the deviation integral value calculated by adder 51 is transmitted to adder 41 of controller 28, and also input to adder 51.

When switch 52 is in the state in which compensator 40 and adder 54 are connected (see E shown in FIG. 2), the post-division deviation integral value transmitted by compensator 40 is input to speed control unit 48. Specifically, the post-division deviation integral value transmitted by compensator 40 is multiplied by integral gain 53, and input to adder 54. Also, the post-division deviation integral value transmitted by compensator 40 is transmitted to adder 41 of controller 28, and also input to adder 51. When the post-division deviation integral value is input, adder 51 calculates a deviation integral value by integrating the speed deviation to the input post-division deviation integral value.

Adder 54 adds the speed deviation calculated by deviation calculation unit 46 and a value calculated by multiplying the deviation integral value or the post-division deviation integral value by integral gain 53. The value calculated by adder 54 is multiplied by proportional gain 55, and input to current control unit 50 via a torque filter (not shown) as a torque instruction. In this way, speed control unit 48 generates a torque instruction by using the deviation integral value or the post-division deviation integral value. By using the torque filter, the shock that occurs when switching the power supply target coils can be reduced.

When a switching signal that determines that the coil is a power supply target is transmitted from switcher 36, switching processor 56 applies the torque instruction output from speed control unit 48 to current control unit 50. When a switching signal that determines that the coil is not a power supply target is transmitted from switcher 36, switching processor 56 applies torque instruction 0 to current control unit 50. Specifically, switching processor 56 includes switch 57, and when a switching signal that determines that the coil is a power supply target is received from switcher 36, switching processor 56 switches switch 57 to a state in which speed control unit 48 and current control unit 50 are connected (see F shown in FIG. 2), and applies the torque instruction output from speed control unit 48 to current control unit 50. On the other hand, when a switching signal that determines that the coil is not a power supply target is received from switcher 36, switching processor 56 switches switch 57 to a state in which speed control unit 48 and current control unit 50 are not connected (see G shown in FIG. 2), and applies torque instruction 0 to current control unit 50.

Current control unit 50 supplies power to the power supply target coil based on the generated torque instruction. For example, current control unit 50 sets a voltage value based on the received torque instruction, and supplies power to the power supply target coil based on the set voltage value. As a result, permanent magnet 24 moves in the arrangement direction by being pulled or pushed by the one or more power supply target coils.

Second to tenth amplifiers 30b to 30j have the same configuration as that of first amplifier 30a. Accordingly, the description of first amplifier 30a given above applies to second to tenth amplifiers 30b to 30j, and thus a detailed description of second to tenth amplifiers 30b to 30j is omitted.

For example, control device 14 can perform PID (Proportional-Integral-Differential Controller) control by using the post-division deviation integral value, the deviation integral value, or the like.

Next, a description of an example of an operation performed by linear motor system 10 configured as described above will be given.

Figure 3:
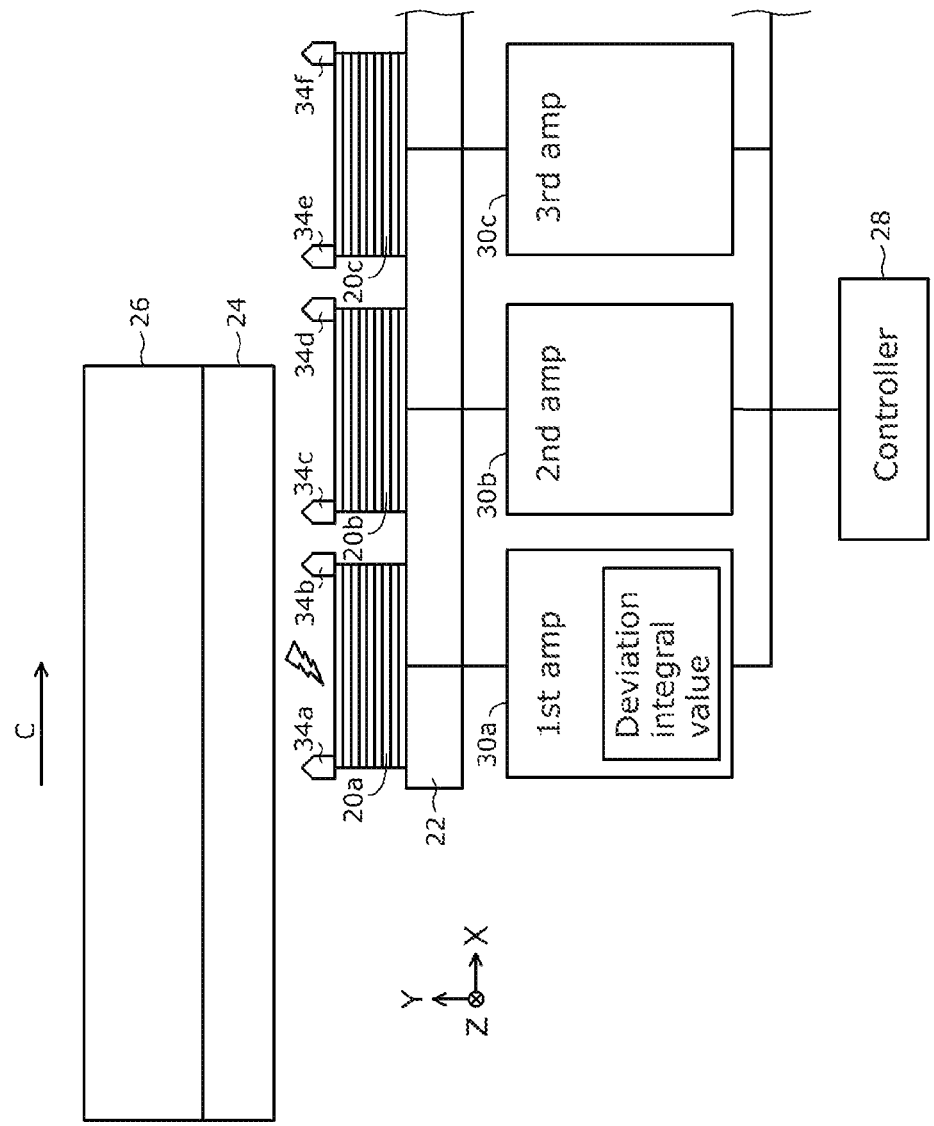
FIG. 3 is an illustrative diagram illustrating an example of an operation performed by the linear motor system shown in FIG. 1A, showing a first state.
Figure 4:
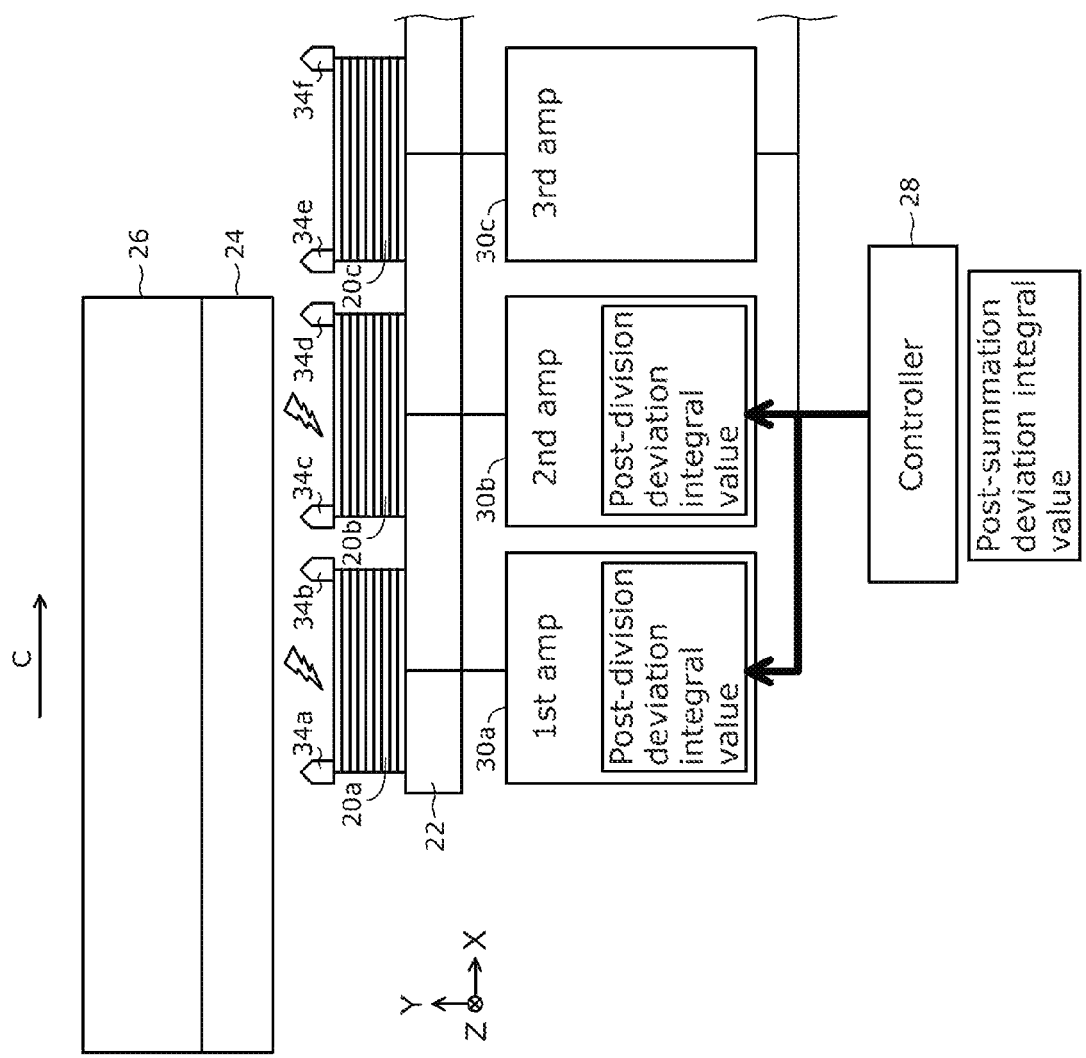
FIG. 4 is an illustrative diagram illustrating an example of an operation performed by the linear motor system shown in FIG. 1A, showing a second state.
Figure 5:
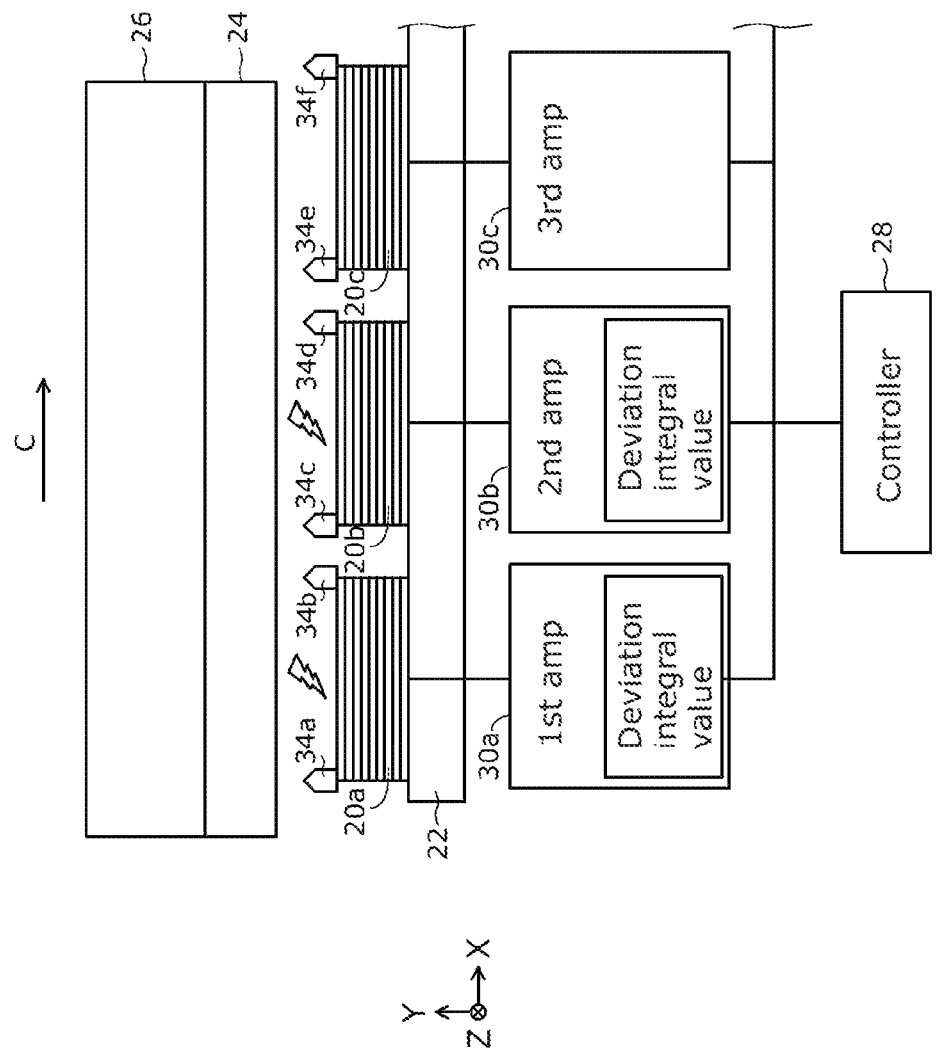
FIG. 5 is an illustrative diagram illustrating an example of an operation performed by the linear motor system shown in FIG. 1A, showing a third state.
Figure 6:
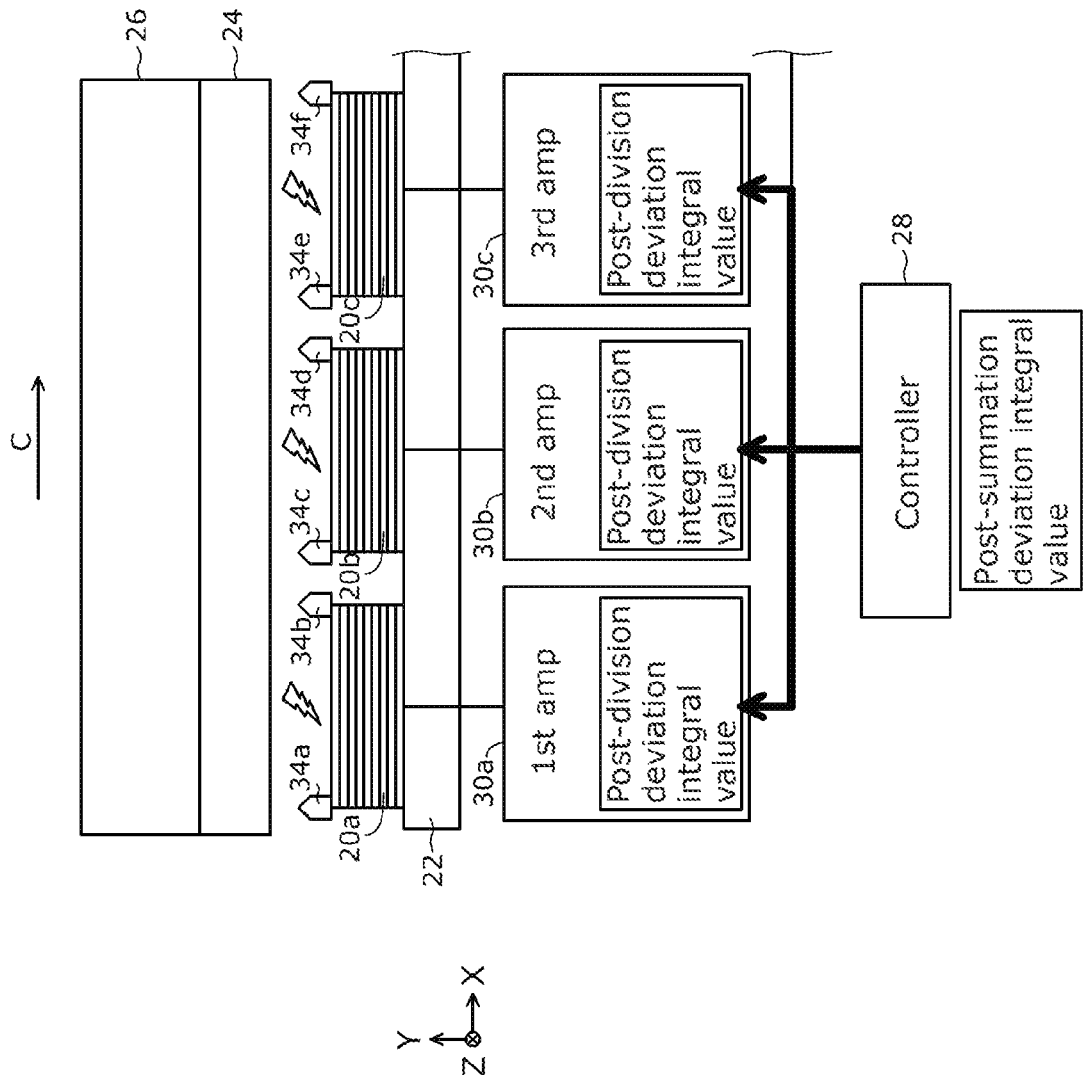
FIG. 6 is an illustrative diagram illustrating an example of an operation performed by the linear motor system shown in FIG. 1A, showing a fourth state.

FIG. 3 is an illustrative diagram illustrating an example of an operation performed by linear motor system 10 shown in FIG. 1A, showing a first state. FIG. 4 is an illustrative diagram illustrating an example of an operation performed by linear motor system 10 shown in FIG. 1A, showing a second state. FIG. 5 is an illustrative diagram illustrating an example of an operation performed by linear motor system 10 shown in FIG. 1A, showing a third state. FIG. 6 is an illustrative diagram illustrating an example of an operation performed by linear motor system 10 shown in FIG. 1A, showing a fourth state. Examples of operations performed by linear motor system 10 will be described with reference to FIGS. 3 to 6.

In the state shown in FIG. 3, first position sensor 34a and second position sensor 34b that are disposed at opposite ends of first coil 20a in the arrangement direction both face permanent magnet 24 in the transverse direction and detect permanent magnet 24. Accordingly, controller 28 selects first coil 20a as a power supply target coil. Furthermore, controller 28 transmits a switching signal that determines that first coil 20a is a power supply target to switching processor 56 of first amplifier 30a. In contrast, third position sensor 34c disposed at one end of second coil 20b in the arrangement direction faces permanent magnet 24 in the transverse direction, and detects permanent magnet 24, while fourth position sensor 34d disposed at the other end of second coil 20b in the arrangement direction does not face permanent magnet 24 in the transverse direction, and does not detect permanent magnet 24. Accordingly, controller 28 does not select second coil 20b as a power supply target coil. Furthermore, controller 28 transmits a switching signal that determines that second coil 20b is not a power supply target to switching processor 56 of second amplifier 30b. Also, fifth position sensor 34e and sixth position sensor 34f that are disposed at opposite ends of third coil 20c in the arrangement direction both do not face permanent magnet 24 in the transverse direction, and do not detect permanent magnet 24. Accordingly, controller 28 does not select third coil 20c as a power supply target coil. Furthermore, controller 28 transmits a switching signal that determines that third coil 20c is not a power supply target to switching processor 56 of third amplifier 30c. As described above, in the state shown in FIG. 3, controller 28 selects first coil 20a as a power supply target coil, and thus first amplifier 30a that corresponds to first coil 20a serves as a power supply target amplifier.

After having selected a power supply target coil, controller 28 transmits an instruction such as a speed instruction or a position instruction to a power supply target amplifier that corresponds to the selected power supply target coil. In the state shown in FIG. 3, controller 28 transmits an instruction to first amplifier 30a.

Figure 7:
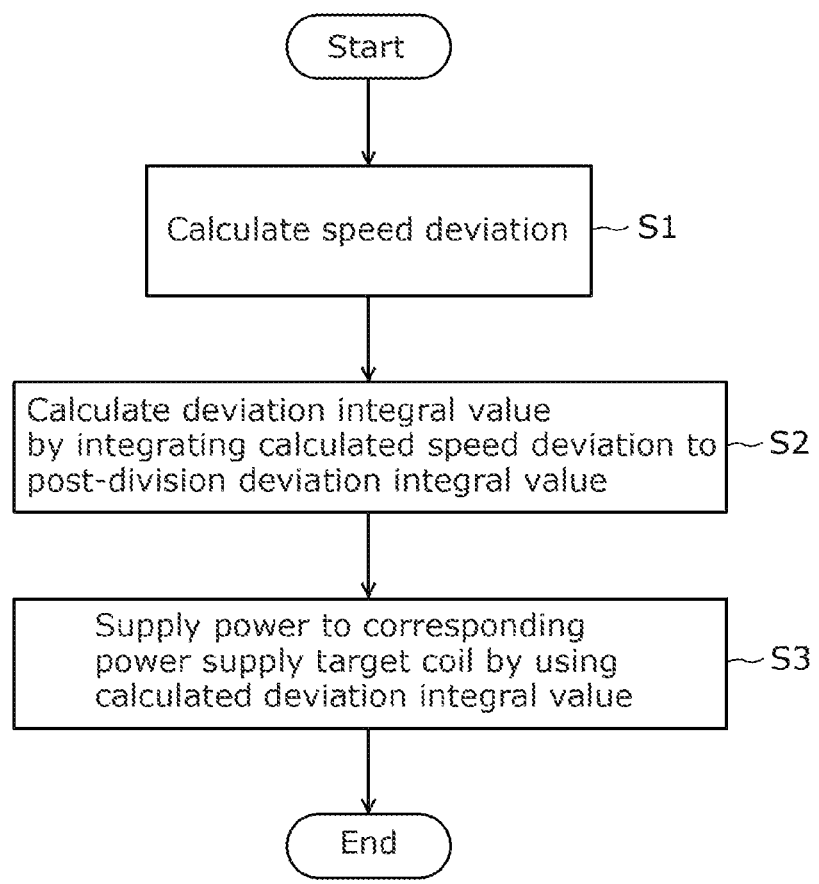
FIG. 7 is a flow diagram showing an example of an operation performed by an power supply target amplifier included in the linear motor system shown in FIG. 1A.

First amplifier 30a that has received the instruction from controller 28 calculates a speed deviation, and supplies power to first coil 20a that serves as a power supply target coil by using the calculated speed deviation. FIG. 7 is a flow diagram showing an example of an operation performed by a power supply target amplifier. The operation of first amplifier 30a in the state shown in FIG. 3 will be described with reference to FIG. 7.

First, first amplifier 30a calculates a speed deviation that is a difference between the instructed speed of permanent magnet 24 indicated by the instruction and the actual speed of permanent magnet 24 (step S1).

Next, first amplifier 30a calculates a deviation integral value by integrating the calculated speed deviation to the post-division deviation integral value (step S2). In the state shown in FIG. 3, switching of power supply target coils has not been performed yet, and thus the post-division deviation integral value is set to 0.

Finally, first amplifier 30a supplies power to first coil 20a that serves as a power supply target coil by using the deviation integral value (step S3). Specifically, first amplifier 30a supplies power to first coil 20a that serves as a power supply target coil by using the deviation integral value calculated immediately beforehand.

First amplifier 30a repeatedly performs the above-described operation.

As a result of power being supplied to first coil 20a, permanent magnet 24 is pulled or pushed by first coil 20a, and moves in the arrangement direction (see arrow C shown in FIG. 3). The flow direction of electric current supplied to first coil 20a is set according to the positions of the magnetic poles of permanent magnet 24. By inputting information such as the size of permanent magnet 24 and the positions of the magnetic poles of permanent magnet 24 to first amplifier 30a and the like in advance, first amplifier 30a determines the positions of the magnetic poles of permanent magnet 24 according to the position of permanent magnet 24, and sets the flow direction of electric current.

Next, an example of an operation for performing switching from one power supply target coil to two power supply target coils will be described with reference to FIGS. 3 and 4. In the case where switching is performed from the state shown in FIG. 3 to the state shown in FIG. 4, fourth position sensor 34d on the forward side in the moving direction (see arrow C) of permanent magnet 24 detects the leading end of permanent magnet 24 as a result of fourth position sensor 34d facing the leading end of permanent magnet 24 in the transverse direction. Accordingly, controller 28 selects second coil 20b on which fourth position sensor 34d is disposed, as a power supply target coil. Accordingly, in the state shown in FIG. 4, first amplifier 30a and second amplifier 30b serve as power supply target amplifiers. Controller 28 transmits, to switching processors 56 of first amplifier 30a and second amplifier 30b that serve as power supply target amplifiers, a switching signal that determines that first coil 20a and second coil 20b are power supply targets and an instruction, and performs compensation for first amplifier 30a and second amplifier 30b.

Figure 8:
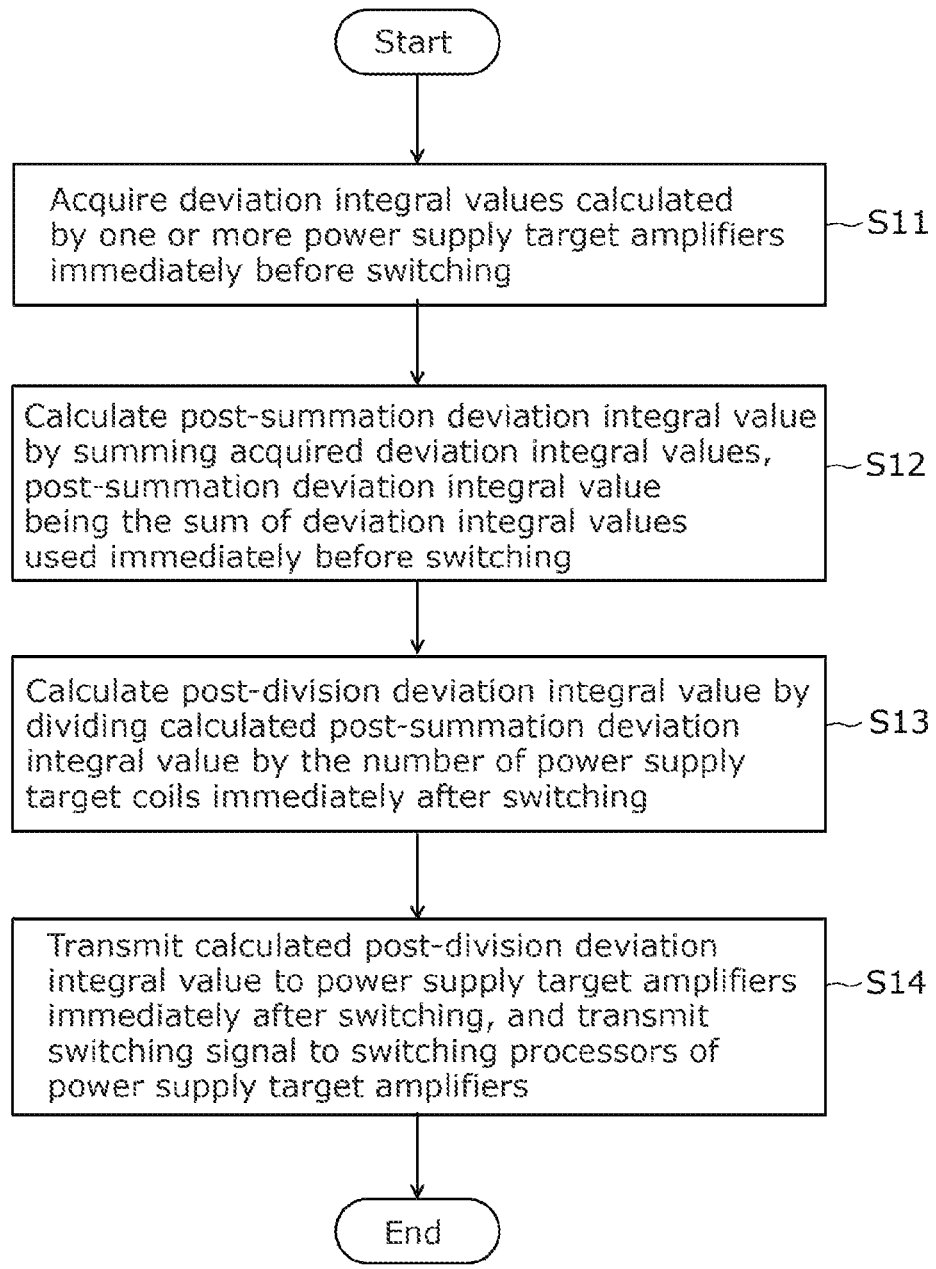
FIG. 8 is a flow diagram showing an example of an operation performed by a compensator included in the linear motor system shown in FIG. 1A.

FIG. 8 is a flow diagram showing an example of an operation performed by controller 28. An operation for switching one or more power supply target coils performed by controller 28 will be described with reference to FIG. 8, in addition to FIGS. 3 and 4.

First, immediately before switching one or more power supply target coils, controller 28 acquires deviation integral values calculated by one or more power supply target amplifiers (step S11). In the case where switching is performed from the state shown in FIG. 3 to the state shown in FIG. 4, controller 28 acquires a deviation integral value calculated by first amplifier 30a that serves as a power supply target amplifier immediately before switching.

Next, controller 28 calculates a post-summation deviation integral value by summing the acquired deviation integral values, the post-summation deviation integral value being the sum of deviation integral values used to supply power immediately before switching (step S12). As shown in FIG. 3, there is only one power supply target amplifier immediately before switching, namely, first amplifier 30a. Accordingly, here, the deviation integral value is equal to the post-summation deviation integral value.

Next, controller 28 calculates a post-division deviation integral value by dividing the calculated post-summation deviation integral value by the total number of power supply target coils immediately after switching (step S13). As shown in FIG. 4, there are two power supply target coils immediately after switching, namely, first coil 20a and second coil 20b. Accordingly, controller 28 calculates the post-division deviation integral value by dividing the post-summation deviation integral value by 2.

Finally, controller 28 transmits the post-division deviation integral value to the power supply target amplifiers immediately after switching, and also transmits a switching signal that determines that the coils are power supply targets to switching processors 56 of the power supply target amplifiers (step S14). As shown in FIG. 4, controller 28 transmits the post-division deviation integral value to first amplifier 30a and second amplifier 30b that serve as power supply target amplifiers immediately after switching. At the time of switching, switch 52 is instantaneously switched to the state in which compensator 40 and adder 54 are connected, and the post-division deviation integral value transmitted from controller 28 is input to adder 54 (after being multiplied by integral gain 53) and adder 51 of first amplifier 30a that serves as a power supply target amplifier, and is also input to adder 54 (after being multiplied by integral gain 53) and adder 51 of second amplifier 30b that serves as a power supply target amplifier.

As described above, controller 28 performs compensation by dividing the post-summation deviation integral value, which is the sum of deviation integral values used to supply power by the power supply target amplifiers immediately before switching, by the total number of power supply target amplifiers immediately after switching, and then transmitting the obtained value. As a result, first amplifier 30a and second amplifier 30b that serve as power supply target amplifiers immediately after switching can take over the deviation integral value obtained immediately before switching, and can also supply power by using the post-division deviation integral value. With this configuration, the switching shock can be reduced.

Next, an example of an operation performed by first amplifier 30a and second amplifier 30b that serve as power supply target amplifiers will be described with reference to FIGS. 4, 5, and 7.

First, first amplifier 30a calculates a speed deviation that is a difference between the instructed speed of permanent magnet 24 indicated by the instruction and the actual speed of permanent magnet 24 (step S1).

Next, first amplifier 30a calculates a deviation integral value by integrating the calculated speed deviation to the post-division deviation integral value (step S2).

Finally, first amplifier 30a supplies power to first coil 20a that serves as a power supply target coil by using the deviation integral value (step S3). Specifically, first amplifier 30a supplies power to first coil 20a that serves as a power supply target coil by using the deviation integral value calculated immediately beforehand.

First amplifier 30a repeatedly performs the above-described operation.

Second amplifier 30b also repeatedly performs the same operation as that performed by first amplifier 30a described above, and supplies power to second coil 20b.

As a result of power being supplied to first coil 20a, permanent magnet 24 is pulled or pushed by first coil 20a, and moves in the arrangement direction (see arrow C shown in FIG. 4), and as a result of power being supplied to second coil 20b, permanent magnet 24 is pulled or pushed by second coil 20b, and moves in the arrangement direction. The flow direction of electric current supplied to first coil 20a and the flow direction of electric current supplied to second coil 20b are set according to the positions of the magnetic poles of permanent magnet 24.

Next, an example of an operation for performing switching from two power supply target coils to three power supply target coils will be described with reference to FIGS. 5, 6, and 8. In the case where switching is performed from the state shown in FIG. 5 to the state shown in FIG. 6, sixth position sensor 34f on the forward side in the moving direction (see arrow C) of permanent magnet 24 detects the leading end of permanent magnet 24 as a result of sixth position sensor 34f facing the leading end of permanent magnet 24 in the transverse direction. Accordingly, controller 28 selects third coil 20c on which sixth position sensor 34f is disposed as a power supply target coil. Accordingly, in the state shown in FIG. 6, first amplifier 30a, second amplifier 30b, and third amplifier 30c serve as power supply target amplifiers. Controller 28 transmits a switching signal that determines that first coil 20a, second coil 20b, and third coil 20c are power supply targets, together with an instruction, to switching processors 56 of first amplifier 30a, second amplifier 30b, and third amplifier 30c that serve as power supply target amplifiers, and performs compensation for first amplifier 30a, second amplifier 30b, and third amplifier 30c.

An operation for switching one or more power supply target coils performed by controller 28 will be described with reference to FIG. 8, in addition to FIGS. 5 and 6.

First, immediately before switching one or more power supply target coils, controller 28 acquires deviation integral values calculated by one or more power supply target amplifiers (step S11). In the case where switching is performed from the state shown in FIG. 5 to the state shown in FIG. 6, controller 28 acquires a deviation integral value calculated by first amplifier 30a that serves as a power supply target amplifier immediately before switching and a deviation integral value calculated by second amplifier 30b that serves as a power supply target amplifier immediately before switching.

Next, controller 28 calculates a post-summation deviation integral value by summing the acquired deviation integral values, the post-summation deviation integral value being the sum of deviation integral values used to supply power immediately before switching (step S12). As shown in FIG. 5, there are two power supply target amplifiers immediately before switching, namely, first amplifier 30a and second amplifier 30b. Accordingly, controller 28 calculates the post-summation deviation integral value by summing the deviation integral value acquired from first amplifier 30a and the deviation integral value acquired from second amplifier 30b, the post-summation deviation integral value being the sum of deviation integral values used to supply power immediately before switching.

Next, controller 28 calculates a post-division deviation integral value by dividing the calculated post-summation deviation integral value by the total number of power supply target coils immediately after switching (step S13). As shown in FIG. 6, there are three power supply target coils immediately after switching, namely, first coil 20a, second coil 20b, and third coil 20c. Accordingly, controller 28 calculates the post-division deviation integral value by dividing the calculated post-summation deviation integral value by 3.

Finally, controller 28 transmits the post-division deviation integral value to the power supply target amplifiers immediately after switching, and also transmits a switching signal that determines that first coil 20a, second coil 20b, and third coil 20c are power supply targets to switching processors 56 of the power supply target amplifiers (step S14). As shown in FIG. 6, controller 28 transmits the post-division deviation integral value to first amplifier 30a, second amplifier 30b, and third amplifier 30c that serve as power supply target amplifiers immediately after switching. At the time of switching, switch 52 is instantaneously switched to the state in which compensator 40 and adder 54 are connected, and the post-division deviation integral value transmitted from controller 28 is input to adder 54 (after being multiplied by integral gain 53) and adder 51 of first amplifier 30a that serves as a power supply target amplifier, also input to adder 54 (after being multiplied by integral gain 53) and adder 51 of second amplifier 30b that serves as a power supply target amplifier, and also input to adder 54 (after being multiplied by integral gain 53) and adder 51 of third amplifier 30c that serves as a power supply target amplifier.

When mover 18 further moves, and first position sensor 34a on the rearward side in the moving direction of permanent magnet 24 in the arrangement direction faces the trailing end of permanent magnet 24 in the transverse direction and detects the trailing end of permanent magnet 24, controller 28 does not select first coil 20a on which first position sensor 34a is disposed, as a power supply target coil.

As described above, controller 28 performs compensation by dividing the post-summation deviation integral value, which is which is the sum of deviation integral values used to supply power by the power supply target amplifiers immediately before switching, by the total number of power supply target coils immediately after switching, and then transmitting the obtained value. As a result, first amplifier 30a, second amplifier 30b, and third amplifier 30c that serve as power supply target amplifiers immediately after switching can take over the deviation integral value obtained immediately before switching, and can also supply power by using the post-division deviation integral value. With this configuration, the switching shock can be reduced.

With linear motor system 10 as described above, at the time when one or more power supply target coils are switched, compensator 40 calculates the post-division deviation integral value by dividing the post-summation deviation integral value by the total number of one or more power supply target coils immediately after switching, the post-summation deviation integral value being a value obtained by summing the deviation integral values used to supply power to the one or more power supply target coils immediately before switching. Then, speed control unit 48 generates a torque instruction by using the calculated post-division deviation integral value, and current control unit 50 supplies power to one or more power supply target coils immediately after switching based on the generated torque instruction. Accordingly, even when the total number of one or more power supply target coils varies before and after switching, it is possible to supply power to the one or more power supply target coils immediately after switching by substantially equally dividing the post-summation deviation integral value that is a value obtained by summing the deviation integral values used immediately before switching. As a result, it is possible to suppress sharp variation in thrust applied to the mover at the time of switching, mover, and thus reduce the switching shock that occurs when the one or more power supply target coils are switched.

Also, at the time of switching, compensator 40 transmits the post-division deviation integral value to the one or more power supply target amplifiers immediately after switching, and speed control units 48 of the one or more power supply target amplifiers immediately after switching generate a torque instruction by using the post-division deviation integral value, and current control units 50 of the one or more power supply target amplifiers immediately after switching supply power to the one or more power supply target coils immediately after switching based on the torque instruction. In this way, each of the one or more power supply target amplifiers immediately after switching can supply power by using the post-division deviation integral value obtained by substantially equally dividing the post-summation deviation integral value that is a value obtained by summing the deviation integral values used immediately before switching. As a result, it is possible to suppress sharp variation in thrust applied to the mover at the time of switching, and thus reduce the switching shock that occurs when the one or more power supply target coils are switched.

Also, each of the one or more power supply target amplifiers immediately before switching calculates the deviation integral value by integrating the speed deviation to the post-division deviation integral value, and compensator 40 calculates the post-summation deviation integral value by summing the deviation integral values calculated by the one or more power supply target amplifiers immediately before switching, the post-summation deviation integral value being a value obtained by summing the deviation integral values used to supply power to the one or more power supply target coils immediately before switching. As a result, compensator 40 can easily calculate the sum of deviation integral values used to supply power to the one or more power supply target coils immediately before switching.

Also, control device 14 further includes controller 28 that is capable of communication with first to tenth amplifiers 30a to 30j, and controller 28 includes compensator 40. As described above, controller 28 is capable of communication with first to tenth amplifiers 30a to 30j, and it is therefore possible to easily perform compensation for first to tenth amplifiers 30a to 30j.

Also, first to twentieth position sensors disposed at opposite ends of each of first to tenth coils 20a to 20j in the arrangement direction are further included. Switcher 36 is configured such that when the position sensor on the forward side in the moving direction of permanent magnet 24 in the arrangement direction in each of first to tenth coils 20a to 20j detects the leading end of permanent magnet 24, switcher 36 selects a coil on which the position sensor is disposed, as a power supply target coil, and when the position sensor on the rearward side in the moving direction of permanent magnet 24 in the arrangement direction detects the trailing end of permanent magnet 24, switcher 36 does not select a coil on which the position sensor is disposed, as a power supply target coil. With this configuration, switcher 36 can easily switch the power supply target coil.

Embodiment 2

Next, a description of Embodiment 2 will be given. Embodiment 2 is different from Embodiment 1 mainly in that each of first to tenth amplifiers includes compensator 40. The following description will be given focusing mainly on differences from Embodiment 1.

Figure 9:
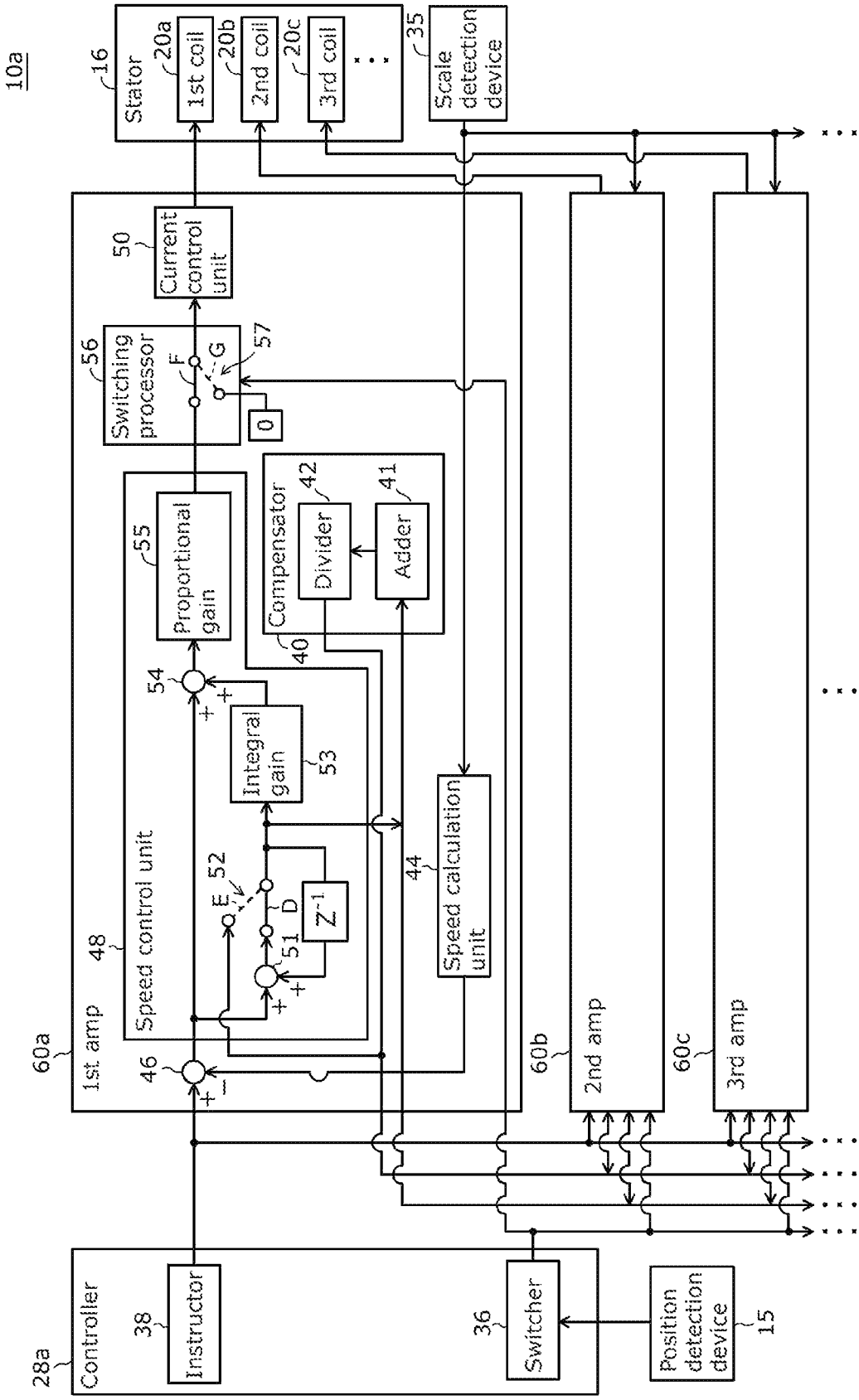
FIG. 9 is a block diagram showing a functional configuration of a linear motor system according to Embodiment 2.

FIG. 9 is a block diagram showing a functional configuration of linear motor system 10a according to Embodiment 2. As shown in FIG. 9, linear motor system 10a according to Embodiment 2 includes controller 28a and first to third amplifiers 60a to 60c. Although not illustrated, linear motor system 10a also includes the fourth to tenth amplifiers.

Controller 28a is different from controller 28 in that controller 28a does not include compensator 40.

First amplifier 60a is different from first amplifier 30a in that first amplifier 60a includes compensator 40. Second amplifier 60b and third amplifier 60c have the same configuration as that of first amplifier 60a. Also, the fourth to tenth amplifiers included in linear motor system 10a also have the same configuration as that of first amplifier 60a. In linear motor system 10a, first amplifier 60a, second amplifier 60b, third amplifier 60c, and the fourth to tenth amplifiers are capable of communication with each other.

Figure 10:
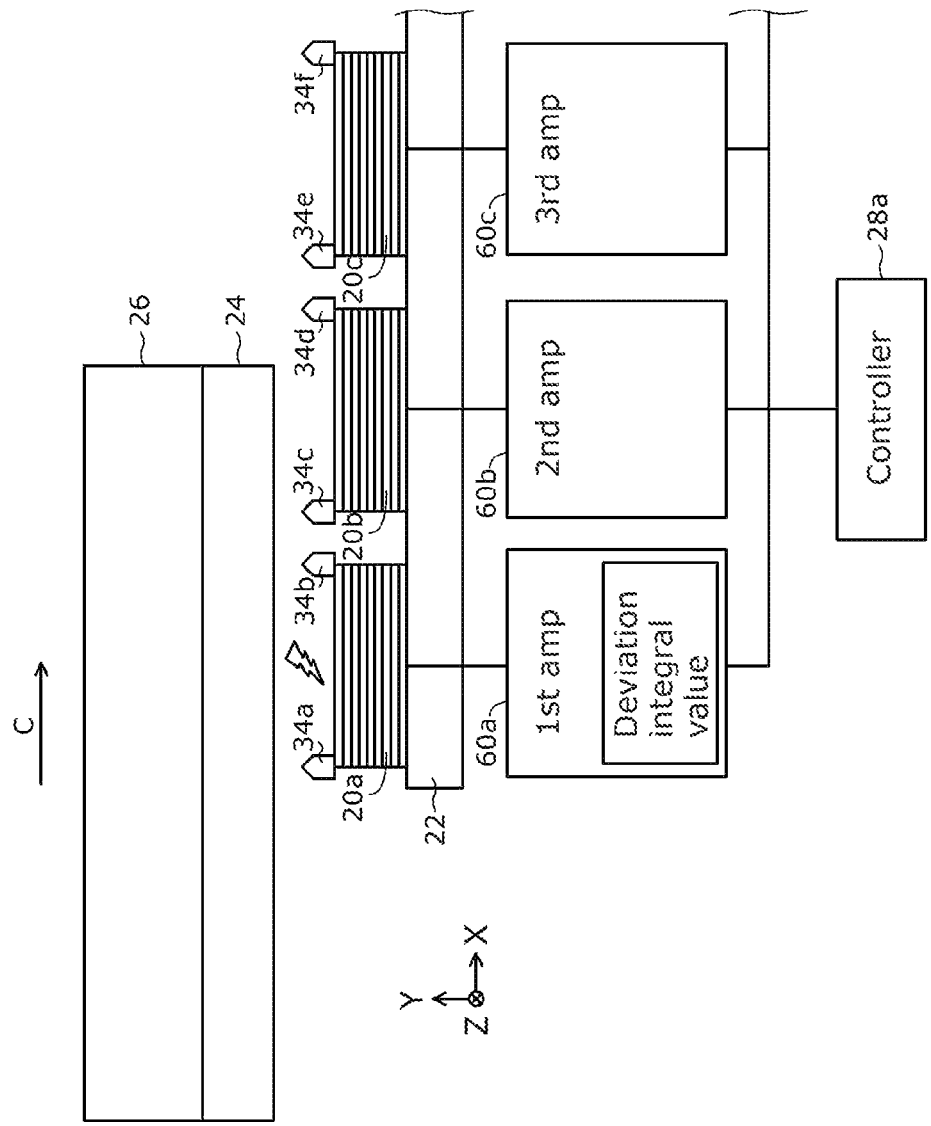
FIG. 10 is an illustrative diagram illustrating an example of an operation performed by the linear motor system shown in FIG. 9, showing a first state.
Figure 11:
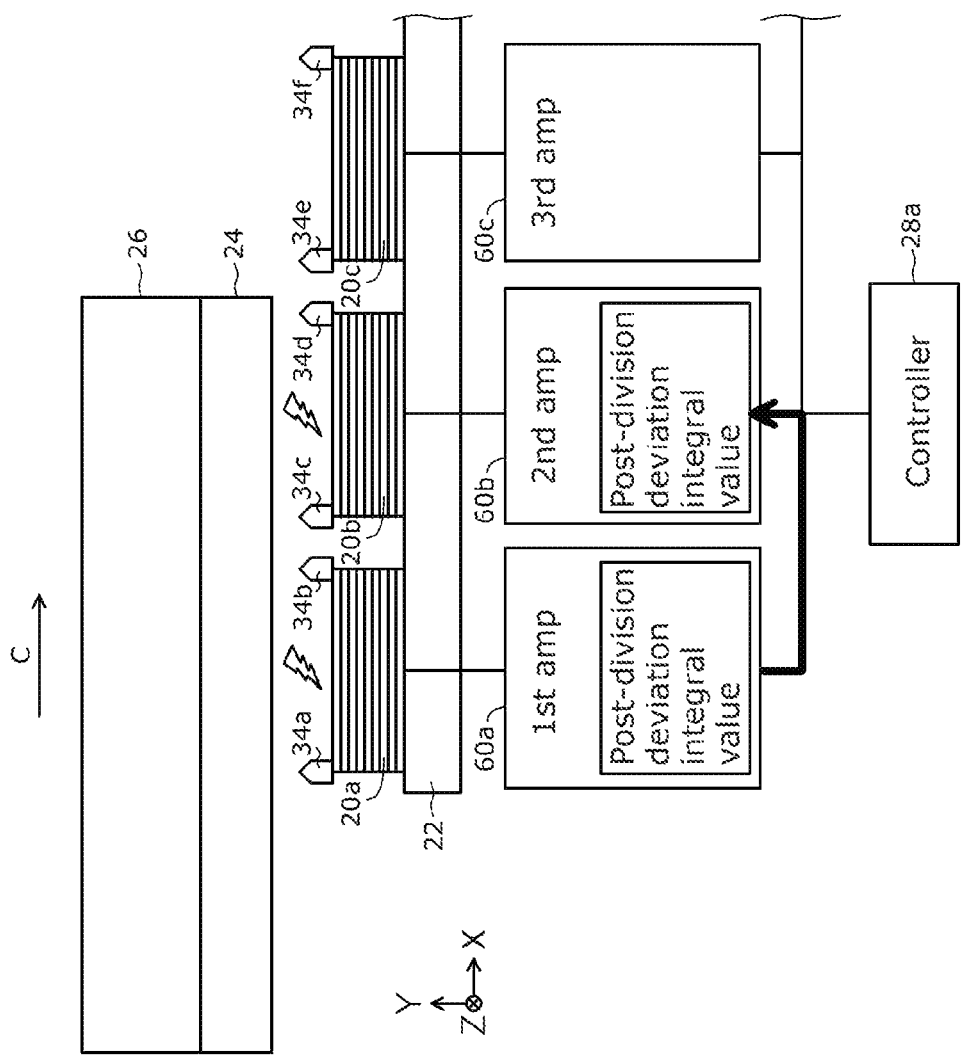
FIG. 11 is an illustrative diagram illustrating an example of an operation performed by the linear motor system shown in FIG. 9, showing a second state.
Figure 12:
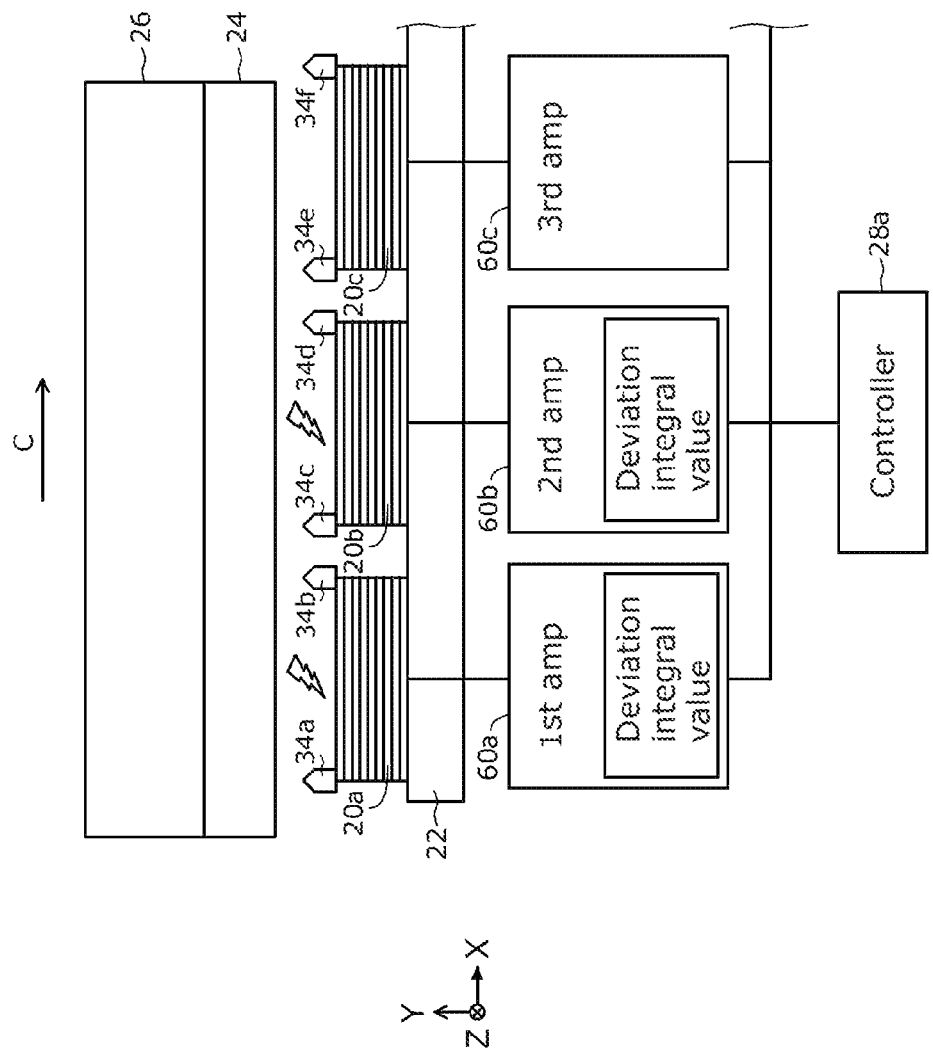
FIG. 12 is an illustrative diagram illustrating an example of an operation performed by the linear motor system shown in FIG. 9, showing a third state.
Figure 13:
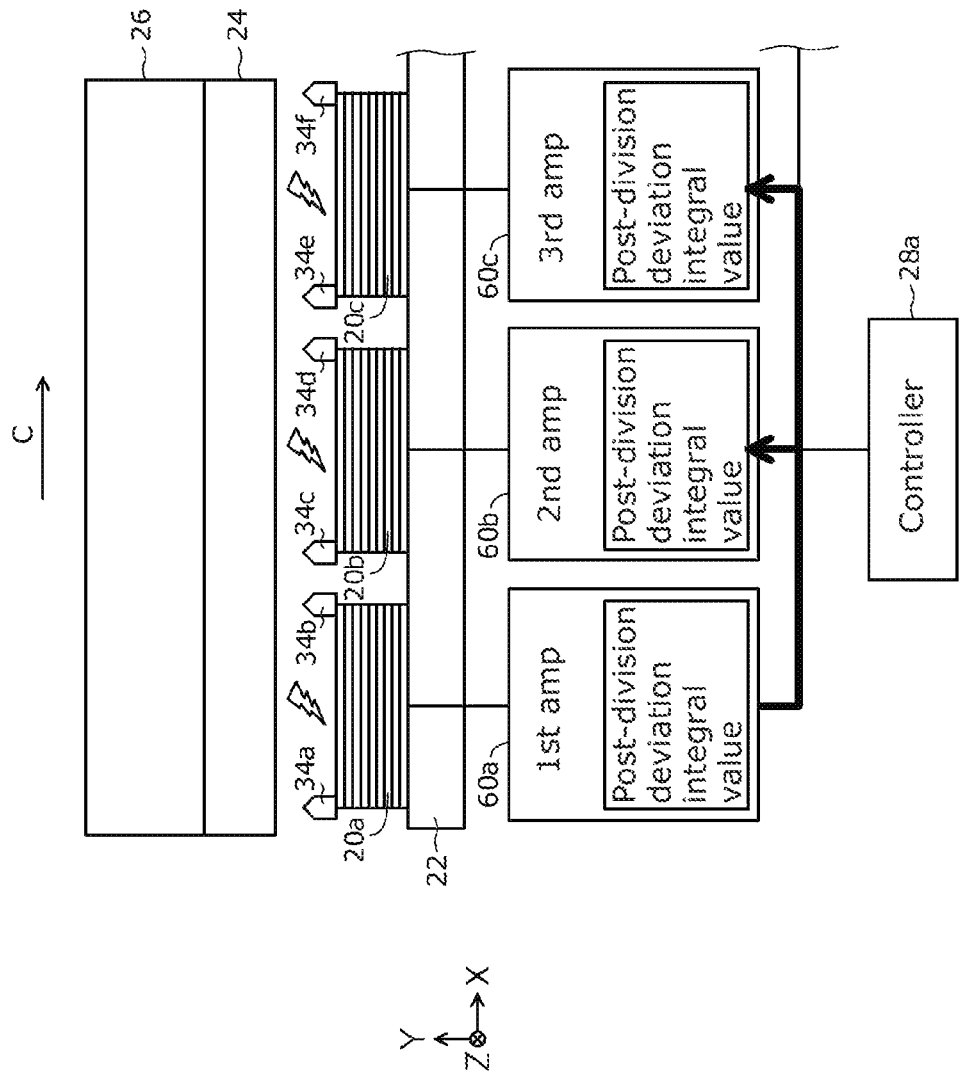
FIG. 13 is an illustrative diagram illustrating an example of an operation performed by the linear motor system shown in FIG. 9, showing a fourth state.

FIG. 10 is an illustrative diagram illustrating an example of an operation performed by linear motor system 10a shown in FIG. 9, showing a first state. FIG. 11 is an illustrative diagram illustrating an example of an operation performed by linear motor system 10a shown in FIG. 9, showing a second state. FIG. 12 is an illustrative diagram illustrating an example of an operation performed by linear motor system 10a shown in FIG. 9, showing a third state. FIG. 13 is an illustrative diagram illustrating an example of an operation performed by linear motor system 10a shown in FIG. 9, showing a fourth state. Examples of operations performed by linear motor system 10a will be described with reference to FIGS. 10 to 13.

An example of an operation for performing switching from one power supply target coil to two power supply target coils will be described with reference to FIGS. 10 and 11. In the state shown in FIG. 10, first amplifier 60a serves as a power supply target amplifier, and in the state shown in FIG. 11, first amplifier 60a and second amplifier 60b serve as power supply target amplifiers. Compensator 40 of first amplifier 60a that serves as a power supply target amplifier immediately before switching performs compensation for first amplifier 60a and second amplifier 60b that serve as power supply target amplifiers immediately after switching. Specifically, compensator 40 of first amplifier 60a performs compensation for first amplifier 60a and second amplifier 60b that serve as power supply target amplifiers immediately after switching by performing the same operation as that performed by compensator 40 of controller 28 when switching is performed from the state shown in FIG. 3 to the state shown in FIG. 4. That is, at the time of switching, compensator 40 of first amplifier 60a immediately before switching calculates a post-division deviation integral value by dividing the post-summation deviation integral value by the total number of one or more power supply target coils immediately after switching, and transmits the post-division deviation integral value to first amplifier 60a and second amplifier 60b that serve as power supply target amplifiers immediately after switching.

Next, an example of an operation for performing switching from two power supply target coils to three power supply target coils will be described with reference to FIGS. 12 and 13. In the state shown in FIG. 12, first amplifier 60a and second amplifier 60b serve as power supply target amplifiers, and in the state shown in FIG. 13, first amplifier 60a, second amplifier 60b, and third amplifier 60c serve as power supply target amplifiers. Either one of compensator 40 of first amplifier 60a and compensator 40 of second amplifier 60b, first amplifier 60a and second amplifier 60b serving as power supply target amplifiers immediately before switching, performs compensation for first amplifier 60a, second amplifier 60b, and third amplifier 60c that serve as power supply target amplifiers immediately after switching. Specifically, either one of compensator 40 of first amplifier 60a and compensator 40 of second amplifier 60b performs compensation for first amplifier 60a, second amplifier 60b, and third amplifier 60c that serve as power supply target amplifiers immediately after switching by performing the same operation as that performed by controller 28 when switching is performed from the state shown in FIG. 5 to the state shown in FIG. 6. That is, at the time of switching, compensator 40 of first amplifier 60a or compensator 40 of second amplifier 60b immediately before switching calculates a post-division deviation integral value by dividing the post-summation deviation integral value by the total number of one or more power supply target coils immediately after switching, and transmits the post-division deviation integral value to first amplifier 60a, second amplifier 60b, and third amplifier 60c that serve as power supply target amplifiers immediately after switching. FIG. 13 shows an example in which compensator 40 of first amplifier 60a performs compensation.

For example, an amplifier that was not selected as a power supply target amplifier immediately before one or more power supply target coils are switched may perform compensation for one or more power supply target amplifiers immediately after switching.

With linear motor system 10a as described above, first to third amplifiers 60a to 60c and the fourth to tenth amplifiers are capable of communication with each other, and each of first to third amplifiers 60a to 60c and the fourth to tenth amplifiers includes compensator 40. Compensator 40 included in each of one or more power supply target amplifiers immediately before switching calculates a post-division deviation integral value by dividing the post-summation deviation integral value by the total number of one or more power supply target coils immediately after switching, and transmits the post-division deviation integral value to each of one or more power supply target amplifiers immediately after switching. In this way, because first to third amplifiers 60a to 60c and the fourth to tenth amplifiers are capable of communication with each other, it is possible to perform compensation for the one or more power supply target amplifiers immediately after switching without providing a superordinate control unit.

(Supplementary Description)

Up to here, Embodiment 1 and Embodiment 2 have been described as examples of the technique disclosed in the present application. However, the technique disclosed in the present application is not limited thereto, and is also applicable to embodiments and variations obtained by making modifications, replacements, additions, omissions, and the like as appropriate without departing from the scope of the present disclosure.

For example, in the embodiments given above, an example has been described in which the first to tenth amplifiers each include speed calculation unit 44 and deviation calculation unit 46. However, the configuration is not limited thereto. For example, the controller may include speed calculation unit 44 and deviation calculation unit 46.

Also, for example, in the embodiments given above, an example has been described in which linear motor system 10a includes controller 28a. However, the configuration is not limited thereto. For example, the linear motor system may not include a controller. In this case, each of the first to tenth amplifiers may include an instructor and a switcher.

In the foregoing description, switcher 36 is configured to select one or more coils from among a plurality of coils as one or more power supply target coils that serve as power supply targets, the one or more coils each including an entire region extending across opposite ends in the arrangement direction that faces permanent magnet 24. However, the configuration is not limited thereto. For example, in FIG. 1A, the entire region extending across opposite ends of second coil 20b faces permanent magnet 24 when viewed from the transverse direction. However, for example, even when second coil 20b does not partially face permanent magnet 24 when viewed from the transverse direction, as long as opposite ends of second coil 20b in the arrangement direction (X direction) face permanent magnet 24, second coil 20b may be selected as a power supply target coil.

INDUSTRIAL APPLICABILITY

The linear motor system according to the present disclosure is widely applicable to a transportation device and the like.

The invention claimed is:
1. A linear motor system comprising:
a stator including a plurality of coils that are arranged in a line;
a mover including a permanent magnet disposed opposite to the plurality of coils;
a switcher that selects, from among the plurality of coils, one or more coils each including a region extending across opposite ends in an arrangement direction that faces the permanent magnet as one or more power supply target coils that serve as power supply targets, and switches the one or more power supply target coils in response to a movement of the permanent magnet; and
a control device that supplies power to the one or more power supply target coils by using a deviation integral value obtained by integrating a speed deviation that is a difference between an instructed speed of the mover and an actual speed of the mover,
wherein the control device includes:
a compensator that calculates a post-division deviation integral value by dividing a post-summation deviation integral value by a total number of the one or more power supply target coils immediately after the switching, the post-summation deviation integral value being a value obtained by summing the deviation integral value used to supply power to each of the one or more power supply target coils immediately before the switching;
a speed control unit that generates a torque instruction by using the post-division deviation integral value calculated by the compensator; and
a current control unit that supplies power to the one or more power supply target coils immediately after the switching, based on the torque instruction generated by the speed control unit.

2. The linear motor system according to claim 1, wherein the control device includes a plurality of control units provided in one-to-one correspondence with the plurality of coils,
each of the plurality of control units includes the speed control unit and the current control unit,
the compensator transmits, when the switching is performed, the post-division deviation integral value to one or more power supply target control units immediately after the switching, the one or more power supply target control units being one or more control units out of the plurality of control units that correspond to the one or more power supply target coils,
the speed control unit included in each of the one or more power supply target control units immediately after the switching generates the torque instruction by using the post-division deviation integral value, and
the current control unit included in each of the one or more power supply target control units immediately after the switching supplies power to the one or more power supply target coils immediately after the switching based on the torque instruction.

3. The linear motor system according to claim 2, wherein each of the one or more power supply target control units immediately before the switching calculates the deviation integral value by integrating the speed deviation to the post-division deviation integral value, and
the compensator calculates the post-summation deviation integral value by summing the deviation integral value calculated by each of the one or more power supply target control units immediately before the switching.

4. The linear motor system according to claim 2, wherein the control device further includes a superordinate control unit that is capable of communication with the plurality of control units, and
the superordinate control unit includes the compensator.

5. The linear motor system according to claim 2, wherein the plurality of control units are capable of communication with each other,
each of the plurality of control units includes the compensator, and
the compensator included in each of the one or more power supply target control units immediately before the switching calculates, when the switching is performed, the post-division deviation integral value by dividing the post-summation deviation integral value by the total number of the one or more power supply target coils immediately after the switching, and transmits the post-division deviation integral value to each of the one or more power supply target control units immediately after the switching.

6. The linear motor system according to claim 1, further comprising a plurality of position detectors provided at opposite ends of each of the plurality of coils in the arrangement direction,
wherein, in each of the plurality of coils,
when one of the position detectors that is provided on a forward side in a moving direction of the permanent magnet in the arrangement direction detects a leading end of the permanent magnet, the switcher selects the coil on which the position detector is disposed as one of the one or more power supply target coils, and when another one of the position detectors that is provided on a rearward side in the moving direction of the permanent magnet in the arrangement direction detects a trailing end of the permanent magnet, the switcher does not select the coil on which the position detector is disposed as one of the one or more power supply target coils.

* * * * *